United States Patent
Chen et al.

(10) Patent No.: US 12,075,079 B1
(45) Date of Patent: *Aug. 27, 2024

(54) METHOD AND APPARATUS FOR ENCODING OR DECODING VIDEO

(71) Applicant: ALIBABA GROUP HOLDING LIMITED, Grand Cayman (KY)

(72) Inventors: Jie Chen, Beijing (CN); Ru-Ling Liao, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,356

(22) Filed: Mar. 21, 2023

Related U.S. Application Data

(63) Continuation of application No. 16/998,221, filed on Aug. 20, 2020, now Pat. No. 11,641,475.
(Continued)

(51) Int. Cl.
*H04N 19/467* (2014.01)
*H04N 19/109* (2014.01)
(Continued)

(52) U.S. Cl.
CPC ......... *H04N 19/463* (2014.11); *H04N 19/109* (2014.11); *H04N 19/137* (2014.11);
(Continued)

(58) Field of Classification Search
CPC .. H04N 19/463; H04N 19/109; H04N 19/137; H04N 19/159; H04N 19/172; H04N 19/51
See application file for complete search history.

(56) References Cited

U.S. PATENT DOCUMENTS

| 8,290,038 B1 | 10/2012 | Wang et al. |
| 11,641,475 B2 * | 5/2023 | Chen ...................... H04N 19/70 375/240.02 |

(Continued)

FOREIGN PATENT DOCUMENTS

| WO | WO 2019/089933 A1 | 5/2019 |
| WO | WO 2019/238008 A1 | 12/2019 |
| WO | WO 2020/253858 A1 | 12/2020 |

OTHER PUBLICATIONS

Bross et al., "Versatile Video Coding (Draft 4)," JVET-N1001-v10, 13th Meeting: Marakech, MA, Jan. 9-18, 2019, 300 pages.
(Continued)

*Primary Examiner* — Fabio S Lima
(74) *Attorney, Agent, or Firm* — Finnegan, Henderson, Farabow, Garrett & Dunner, LLP

(57) ABSTRACT

The present disclosure provides a computer-implemented method for encoding video. The method includes coding one or more first flags in a sequence parameter set (SPS) of a bitstream, and coding at least one second flag in the SPS if one or more coding modes are enabled for a video sequence associated with the SPS. The one or more first flags indicate whether the one or more coding modes are enabled for the video sequence. The at least one second flag indicates whether a multi-level control is activated for the one or more coding modes.

20 Claims, 31 Drawing Sheets

Related U.S. Application Data

(60) Provisional application No. 62/902,921, filed on Sep. 19, 2019, provisional application No. 62/899,169, filed on Sep. 12, 2019.

(51) Int. Cl.
  *H04N 19/137* (2014.01)
  *H04N 19/159* (2014.01)
  *H04N 19/172* (2014.01)
  *H04N 19/463* (2014.01)
  *H04N 19/51* (2014.01)

(52) U.S. Cl.
  CPC ......... *H04N 19/159* (2014.11); *H04N 19/172* (2014.11); *H04N 19/51* (2014.11)

(56) References Cited

U.S. PATENT DOCUMENTS

| | | | |
|---|---|---|---|
| 2005/0013372 A1* | 1/2005 | Srinivasan | H04N 19/44 375/E7.123 |
| 2012/0207227 A1 | 8/2012 | Tsai et al. | |
| 2013/0077696 A1 | 3/2013 | Zhou | |
| 2013/0272377 A1* | 10/2013 | Karczewicz | H03M 7/30 341/51 |
| 2014/0003492 A1 | 1/2014 | Chen et al. | |
| 2016/0234494 A1 | 8/2016 | Seregin et al. | |
| 2016/0330481 A1 | 11/2016 | Zhang et al. | |
| 2019/0238883 A1 | 8/2019 | Chen et al. | |
| 2020/0304805 A1 | 9/2020 | Li et al. | |
| 2020/0366888 A1 | 11/2020 | Seregin et al. | |
| 2021/0044833 A1 | 2/2021 | Yang | |
| 2021/0058634 A1 | 2/2021 | Li et al. | |
| 2021/0185338 A1 | 6/2021 | Xiu et al. | |
| 2021/0368198 A1* | 11/2021 | Zhang | H04N 19/513 |
| 2022/0038713 A1* | 2/2022 | Li | H04N 19/117 |
| 2022/0116619 A1* | 4/2022 | Chen | H04N 19/70 |
| 2022/0182659 A1* | 6/2022 | Xiu | H04N 19/105 |
| 2022/0210431 A1 | 6/2022 | Xiu et al. | |
| 2022/0210462 A1 | 6/2022 | Luo et al. | |

OTHER PUBLICATIONS

Bross et al., "Versatile Video Coding (Draft 6)," JVET-O2001-vE, 15$^{th}$ Meeting: Gothenburg, SE, Jul. 3-12, 2019, 455 pages.

Chen et al., "Algorithm description for Versatile Vide Coding and Test Model 6 (VTM 6)," JVET-O2002-v2, 15$^{th}$ Meeting: Gothenburg, SE, 87 pages (2019).

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

PCT International Search Report and Written Opinion mailed Dec. 21, 2020, issued in corresponding International Application No. PCT/US2020/047139 (11 pgs.).

PCT International Search Report and Written Opinion mailed Nov. 9, 2020, issued in corresponding International Application No. PCT/US2020/047113 (6 pgs.).

Schafer et al., "Digital Video Coding Standards and Their Role in Video Communications," Proceedings of the IEEE, vol. 83, No. 6, pp. 907-924 (1995).

Segall et al., "Joint Call for Proposals on Video Compression with Capability beyond HEVC," JVET-H1002 (v6), 8$^{th}$ Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

700
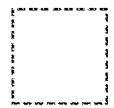
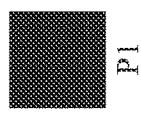
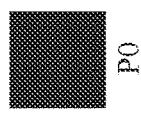
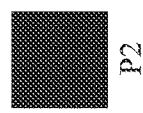
FIG. 7

Exemplary SPS syntax

| seq_parameter_set_rbsp( ) { | Descriptor |
|---|---|
| ... | |
|   sps_bdof_enabled_flag | u(1) |
|   sps_smvd_enabled_flag | u(1) |
|   sps_dmvr_enabled_flag | u(1) |
|   if( sps_bdof_enabled_flag \|\| sps_dmvr_enabled_flag) | |
|     sps_bdof_dmvr_slice_present_flag | u(1) |
| ... | |
|   if( sps_affine_enabled_flag ) { | |
|     sps_affine_type_flag | u(1) |
|     sps_affine_amvr_enabled_flag | u(1) |
|     sps_affine_prof_enabled_flag | u(1) |
|   } | |
| ... | |

FIG. 16

Exemplary slice header syntax

| slice_header( ) { | Descriptor |
|---|---|
| ... | |
|   if( sps_bdof_dmvr_slice_present_flag ) | |
|     slice_disable_bdof_dmvr_flag | u(1) |
| ... | |

FIG. 17

Exemplary SPS syntax

| seq_parameter_set_rbsp( ) { | Descriptor |
|---|---|
| ... | |
| sps_bdof_enabled_flag | u(1) |
| *if( sps_bdof_enabled_flag)* | |
| sps_bdof_slice_present_flag | *u(1)* |
| sps_dmvr_enabled_flag | u(1) |
| *if( sps_dmvr_enabled_flag)* | |
| sps_dmvr_slice_present_flag | *u(1)* |
| if( sps_affine_enabled_flag ) { | |
| ... | u(1) |
| sps_affine_prof_enabled_flag | u(1) |
| *if( sps_affine_prof_enabled_flag)* | |
| sps_affine_prof_slice_present_flag | *u(1)* |
| } | |
| | |
| | |
| ... | |

FIG. 18A

Exemplary SPS syntax

| seq_parameter_set_rbsp( ) { | Descriptor |
|---|---|
| ... | |
| sps_bdof_enabled_flag | u(1) |
| *if( sps_bdof_enabled_flag)* | |
| sps_bdof_picture_present_flag | *u(1)* |
| sps_dmvr_enabled_flag | u(1) |
| *if( sps_dmvr_enabled_flag)* | |
| sps_dmvr_picture_present_flag | *u(1)* |
| if( sps_affine_enabled_flag ) { | |
| ... | u(1) |
| sps_affine_prof_enabled_flag | u(1) |
| } | |
| *if( sps_affine_prof_enabled_flag)* | |
| sps_affine_prof_picture_present_flag | *u(1)* |
| ... | |

FIG. 18B

Exemplary slice header syntax

| slice_header( ) { | Descriptor |
|---|---|
| ... | |
| if( sps_bdof_slice_present_flag ) | |
| slice_disable_bdof_flag | u(1) |
| if( sps_dmvr_slice_present_flag ) | |
| slice_disable_dmvr_flag | u(1) |
| if(sps_affine_prof_slice_present_flag) | |
| slice_disable_affine_prof_flag | u(1) |
| | |

FIG. 19A

Exemplary picture header syntax

| picture_header( ) { | Descriptor |
|---|---|
| ... | |
| if( sps_bdof_picture_present_flag ) | |
| ph_disable_bdof_flag | u(1) |
| if( sps_dmvr_picture_present_flag ) | |
| ph_disable_dmvr_flag | u(1) |
| if(sps_affine_prof_picture_present_flag) | |
| ph_disable_affine_prof_flag | u(1) |
| | |

FIG. 19B

Exemplary SPS syntax

| seq_parameter_set_rbsp( ) { | Descriptor |
|---|---|
| ... | |
|   sps_bdof_enabled_flag | u(1) |
|   sps_dmvr_enabled_flag | u(1) |
|   if( sps_affine_enabled_flag ) { | |
|     ... | |
|     sps_affine_prof_enabled_flag | u(1) |
|   } | |
|   *if( sps_bdof_enabled_flag \|\| sps_dmvr_enabled_flag \|\| sps_affine_prof_enabled_flag)* | |
|     sps_bdof_dmvr_affine_prof_slice_present_flag | *u(1)* |
| ... | |

FIG. 20

Exemplary slice header syntax for slice level joint controlling

| slice_header( ) { | Descriptor |
|---|---|
| ... | |
|   *if(sps_bdof_dmvr_affine_prof_slice_present_flag)* | |
|     slice_disable_bdof_dmvr_affine_prof_flag | *u(1)* |
| } | |

FIG. 21

Exemplary slice header syntax for slice level separate controlling

| slice_header( ) { | Descriptor |
|---|---|
| ... | |
|   *if(sps_bdof_dmvr_affine_prof_slice_present_flag && sps_bdof_enabled_flag)* | |
|     slice_disable_bdof_flag | *u(1)* |
|   *if(sps_bdof_dmvr_affine_prof_slice_present_flag && sps_dmvr_enabled_flag)* | |
|     slice_disable_dmvr_flag | *u(1)* |
|   *if(sps_bdof_dmvr_affine_prof_slice_present_flag && sps_affine_prof_enabled_flag)* | |
|     slice_disable_affine_prof_flag | *u(1)* |
| } | |

FIG. 22

Exemplary slice header syntax for slice level separate controlling

| slice_header( ) { | Descriptor |
|---|---|
| ... | |
| if(sps_bdof_dmvr_affine_prof_slice_present_flag && (sps_bdof_enabled_flag\|\| sps_affine_prof_enabled_flag)) | |
|     *slice_disable_bdof_affine_prof_flag* | *u(1)* |
| if(sps_bdof_dmvr_affine_prof_slice_present_flag && sps_dmvr_enabled_flag) | |
|     *slice_disable_dmvr_flag* | *u(1)* |
| | |

FIG. 23

Exemplary slice header syntax for slice level separate controlling

| slice_header( ) { | Descriptor |
|---|---|
| ... | |
| if(sps_bdof_dmvr_affine_prof_slice_present_flag && sps_bdof_enabled_flag && (sps_bdof_enabled_flag\|\| sps_dmvr_enabled_flag)) | |
|     *slice_disable_bdof_dmvr_flag* | *u(1)* |
| if(sps_bdof_dmvr_affine_prof_slice_present_flag && sps_affine_prof_enabled_flag) | |
|     *slice_disable_affine_prof_flag* | *u(1)* |
| | |

FIG. 24

Exemplary SPS syntax

| seq_parameter_set_rbsp( ) { | Descriptor |
|---|---|
| ... | |
| sps_bdof_enabled_flag | u(1) |
| sps_dmvr_enabled_flag | u(1) |
| if( sps_affine_enabled_flag ) { | |
| ... | u(1) |
| sps_affine_prof_enabled_flag | u(1) |
| } | |
| *if( sps_bdof_enabled_flag \|\| sps_affine_prof_enabled_flag)* | |
| *sps_bdof_affine_prof_slice_present_flag* | *u(1)* |
| *if( sps_dmvr_enabled_flag)* | |
| *sps_dmvr_slice_present_flag* | *u(1)* |
| | |
| ... | |

FIG. 25

Exemplary slice header syntax for joint slice level controlling

| slice_header( ) { | Descriptor |
|---|---|
| ... | |
| *if(sps_bdof_affine_prof_slice_present_flag)* | |
| *slice_disable_bdof_affine_prof_flag* | *u(1)* |
| *if(sps_dmvr_slice_present_flag)* | |
| *slice_disable_dmvr_flag* | *u(1)* |
| | |

FIG. 26

Exemplary slice header syntax for separate slice level controlling

| slice_header( ) { | Descriptor |
|---|---|
| ... | |
|    *if(sps_bdof_affine_prof_slice_present_flag && sps_bdof_enabled_flag)* | |
|       slice_disable_bdof_flag | *u(1)* |
|    *if(sps_bdof_affine_prof_slice_present_flag && sps_affine_prof_enabled_flag)* | |
|       slice_disable_affine_prof_flag | *u(1)* |
|    *if(sps_dmvr_slice_present_flag)* | |
|       slice_disable_dmvr_flag | *u(1)* |
| .. | |

FIG. 27

Exemplary SPS syntax

| seq_parameter_set_rbsp( ) { | Descriptor |
|---|---|
| ... | |
|   sps_bdof_enabled_flag | u(1) |
|   sps_dmvr_enabled_flag | u(1) |
|   if( sps_affine_enabled_flag ) { | |
|     ... | u(1) |
|     sps_affine_prof_enabled_flag | u(1) |
|   } | |
|   *if( sps_dmvr_enabled_flag || sps_bdof_enabled_flag)* | |
|     sps_dmvr_bdof_slice_present_flag | *u(1)* |
|   *if( sps_affine_prof_enabled_flag)* | |
|     sps_affine_prof_slice_present_flag | *u(1)* |
| | |
| ... | |

FIG. 28

Exemplary slice header syntax for joint slice level controlling

| slice_header( ) { | Descriptor |
|---|---|
| ... | |
|     *if( sps_dmvr_bdof_slice_present_flag )* | |
|         slice_disable_dmvr_bdof_flag | u(1) |
|     *if( sps_affine_prof_slice_present_flag )* | |
|         slice_disable_affine_prof_flag | u(1) |
| } | |

FIG. 29

Exemplary slice header syntax for separate slice level controlling

| slice_header( ) { | Descriptor |
|---|---|
| ... | |
|     *if( sps_dmvr_bdof_slice_present_flag && sps_dmvr_enabled_flag )* | |
|         slice_disable_dmvr_flag | u(1) |
|     *if( sps_dmvr_bdof_slice_present_flag && sps_bdof_enabled_flag )* | |
|         slice_disable_bdof_flag | u(1) |
|     *if( sps_affine_prof_slice_present_flag )* | |
|         slice_disable_affine_prof_flag | u(1) |
| } | |

FIG. 30

METHOD AND APPARATUS FOR ENCODING OR DECODING VIDEO

CROSS-REFERENCE TO RELATED APPLICATIONS

The present disclosure claims the benefit of and is a continuation of U.S. application Ser. No. 16/998,221, filed on Aug. 20, 2020, which claims priority to U.S. Provisional Patent Application No. 62/899,169, filed Sep. 12, 2019 and entitled "METHOD AND APPARATUS FOR SIGNALING VIDEO CODING INFORMATION," and U.S. Provisional Patent Application No. 62/902,921, filed Sep. 19, 2019 and entitled "METHOD AND APPARATUS FOR SIGNALING VIDEO CODING INFORMATION," all of which are incorporated herein by reference in their entireties.

TECHNICAL FIELD

The present disclosure generally relates to video data processing, and more particularly, to methods and apparatus for signaling controlling information regarding enabling or disabling one or more coding tools.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatus for encoding or decoding video.

In some exemplary embodiments, a non-transitory computer-readable storage medium is provided. The non-transitory computer-readable storage medium stores a set of instructions that are executable by one or more processor of a device to cause the device to perform a method for decoding video of: receiving a bitstream; determining whether one or more coding modes are enabled for a video sequence corresponding to the bitstream, based on one or more first flags in the bitstream; and determining whether a multi-level control is activated for the one or more coding modes, based on at least one second flag in the bitstream.

In some exemplary embodiments, an apparatus is provided. The apparatus includes a memory configured to store instructions and a processor coupled to the memory and configured to execute the instructions to cause the apparatus to: receive a bitstream; determine whether one or more coding modes are enabled for a video sequence corresponding to the bitstream, based on one or more first flags in the bitstream; and determine whether a multi-level control is activated for the one or more coding modes, based on at least one second flag in the bitstream.

In some exemplary embodiments, a computer-implemented method for decoding video is provided. The method includes: receiving a bitstream; determining whether one or more coding modes are enabled for a video sequence corresponding to the bitstream, based on one or more first flags in the bitstream; and determining whether a multi-level control is activated for the one or more coding modes, based on at least one second flag in the bitstream.

BRIEF DESCRIPTION OF THE DRAWINGS

Embodiments and various aspects of present disclosure are illustrated in the following detailed description and the accompanying figures. Various features shown in the figures are not drawn to scale.

FIG. 7 illustrates an example of DMVR integer luma sample searching pattern, consistent with some embodiments of the present disclosure.

FIG. 16 provides an exemplary coding syntax of control flags in a Sequence Parameter Set (SPS), consistent with some embodiments of the disclosure.

FIG. 17 provides an exemplary coding syntax of control flags in the slice header, consistent with some embodiments of the disclosure.

FIG. 18A provides an exemplary coding syntax of control flags in the SPS, consistent with some embodiments of the disclosure.

FIG. 18B provides an exemplary coding syntax of control flags in the SPS, consistent with some embodiments of the disclosure.

FIG. 19A provides an exemplary coding syntax of control flags in the slice header, consistent with some embodiments of the disclosure.

FIG. 19B provides an exemplary coding syntax of control flags in the picture header, consistent with some embodiments of the disclosure.

FIG. 20 provides an exemplary coding syntax of control flags in the SPS, consistent with some embodiments of the disclosure.

FIG. 21 provides an exemplary coding syntax of control flags in the slice header, consistent with some embodiments of the disclosure.

FIG. 22 provides another exemplary coding syntax of control flags in the slice header, consistent with some embodiments of the disclosure.

FIG. 23 provides an exemplary coding syntax of control flags in the slice header, consistent with some embodiments of the disclosure.

FIG. 24 provides another exemplary coding syntax of control flags in the slice header, consistent with some embodiments of the disclosure.

FIG. 25 provides an exemplary coding syntax of control flags in the SPS, consistent with some embodiments of the disclosure.

FIG. 26 provides an exemplary coding syntax of control flags in the slice header, consistent with some embodiments of the disclosure.

FIG. 27 provides another exemplary coding syntax of control flags in the slice header, consistent with some embodiments of the disclosure.

FIG. 28 provides an exemplary coding syntax of control flags in the SPS, consistent with some embodiments of the disclosure.

FIG. 29 provides an exemplary coding syntax of control flags in the slice header, consistent with some embodiments of the disclosure.

FIG. 30 provides another exemplary coding syntax of control flags in the slice header, consistent with some embodiments of the disclosure.

DETAILED DESCRIPTION

Figure 1:
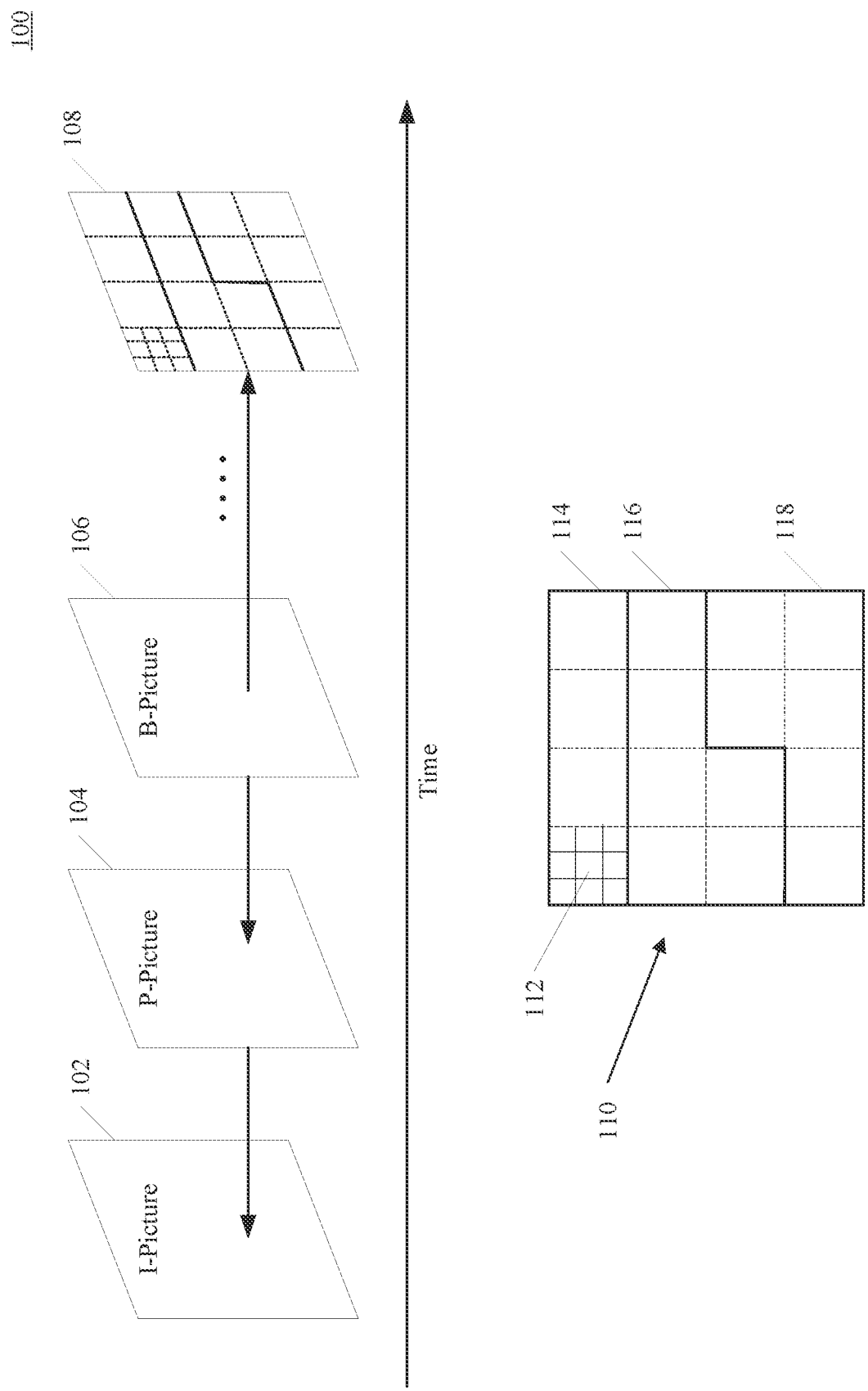
FIG. 1 illustrates structures of an exemplary video sequence, consistent with some embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of present disclosure are described in greater detail below. The terms and definitions provided herein control, if in conflict with terms and/or definitions incorporated by reference.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium.

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

In order to achieve the same subjective quality as High Efficiency Video Coding (HEVC, also known as ITU-T H.265 and MPEG-H Part 2) using half the bandwidth, the Joint Video Experts Team (JVET), a video expert team of the ITU-T Video Coding Expert Group (ITU-T VCEG) and the ISO/IEC Moving Picture Expert Group (ISO/IEC MPEG), has been developing technologies beyond HEVC using the joint exploration model (JEM) reference software. As coding technologies were incorporated into the JEM, the JEM achieved substantially higher coding performance than HEVC. The VCEG and MPEG have started the development of Versatile Video Coding (VVC, also known as ITU-T H.266, MPEG-I Part 3 and Future Video Coding), the next generation video compression standard beyond HEVC.

The VVC standard is continuing to include coding technologies that improve compression performance and is aimed at doubling the compression efficiency of HEVC standard. VVC is based on the same hybrid video coding system that has been used in modern video compression standards such as HEVC, H.264/AVC, MPEG2, H.263, etc.

In this disclosure, a two-level control for enabling or disabling one or more coding tools can be achieved by using flags coded in Sequence Parameter Set (SPS) and coded in picture headers or slide headers in the bitstream. Coding tools can be separately or jointly controlled (e.g., enabled or disabled) for individual pictures or slices. This adaptation can improve the coding performance by disabling less useful coding tool(s) for the current picture or slice. In addition, this two-level adaptation can further reduce the encoding and decoding complexity by disabling some or all coding tools in some slices or pictures during the encoding and decoding process for the video stream.

FIG. 1 illustrates structures of an exemplary video sequence, consistent with some embodiments of the disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider. As shown in FIG. 1, video sequence 100 can include a series of pictures arranged temporally along a timeline, including pictures 102, 104, 106, and 108. Pictures 102-106 are continuous, and there are more pictures between pictures 106 and 108.

When a video is being compressed or decompressed, useful information of a picture being encoded (referred to as a "current picture") include changes with respect to a reference picture (e.g., a picture previously encoded and reconstructed). Such changes can include position changes, luminosity changes, or color changes of the pixels. For example, position changes of a group of pixels can reflect the motion of an object represented by these pixels between two pictures (e.g., the reference picture and the current picture). A picture coded without referencing another picture (i.e., it is its own reference picture) can be referred to as an "I-picture." A picture coded using a previous picture as a reference picture can be referred to as a "P-picture." A picture coded using both a previous picture and a future picture as reference pictures (i.e., the reference is "bi-directional") can be referred to as a "B-picture."

For example, as shown in FIG. 1, picture 102 is an I-picture, using itself as the reference picture. Picture 104 is a P-picture, using picture 102 as its reference picture, as indicated by the arrow. Picture 106 is a B-picture, using pictures 104 and 108 as its reference pictures, as indicated by the arrows. In some embodiments, the reference picture of a picture may be or may be not immediately preceding or following the picture. For example, the reference picture of picture 104 can be a picture preceding picture 102, i.e., a picture not immediately preceding picture 104. The above-described reference pictures of pictures 102-106 shown in FIG. 1 are merely examples, and not meant to limit the present disclosure.

Due to the computing complexity, in some embodiments, video codecs can split a picture into multiple basic segments, and encode or decode the picture segment by segment. That is, video codecs do not necessarily encode or decode an entire picture at one time. Such basic segments are referred to as basic processing units ("BPUs") in this disclosure. For example, FIG. 1 also shows an exemplary structure 110 of a picture of video sequence 100 (e.g., any of pictures 102-108). For example, structure 110 may be used to divide picture 108. As shown in FIG. 1, picture 108 is divided into 4×4 basic processing units. In some embodiments, the basic processing units can be referred to as "coding tree units" ("CTUs") in some video coding standards (e.g., H.265/HEVC or H.266/VVC), or as "macroblocks" in some video coding standards (e.g., MPEG family, H.261, H.263, or H.264/AVC). The basic processing units in FIG. 1 is for illustrative purpose only. The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Operations performed to a basic processing unit can be repeatedly performed to its luma and chroma components.

During multiple stages of operations in video coding, the size of the basic processing units may still be too large for processing, and thus can be further partitioned into segments referred to as "basic processing sub-units" in this disclosure. For example, at a mode decision stage, the encoder can split the basic processing unit into multiple basic processing sub-units, and decide a prediction type for each individual basic processing sub-unit. As shown in FIG. 1, basic processing unit 112 in structure 110 is further partitioned into 3×3 basic processing sub-units. The basic processing sub-units in FIG. 1 is for illustrative purpose only. Different basic processing units of the same picture can be partitioned into basic processing sub-units in different schemes.

In some embodiments, the basic processing sub-units can be referred to as "coding units" ("CUs") in some video coding standards (e.g., H.265/HEVC or H.266/VVC), or as "blocks" in some video coding standards (e.g., MPEG family, H.261, H.263, or H.264/AVC). The size of a basic processing sub-unit can be the same or smaller than the size of a basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Operations performed to a basic processing sub-unit can be repeatedly performed to its luma and chroma components. Such division can be performed to further levels depending on processing needs, and in different stages, the basic processing units can be partitioned using different schemes. At the leaf nodes of the partitioning structure, coding information such as coding mode (e.g., intra prediction mode or inter prediction mode), motion information (e.g., reference index, motion vectors (MVs), etc.) required for corresponding coding mode, and quantized residual coefficients are sent.

In some cases, a basic processing sub-unit can still be too large to process in some stages of operations in video coding, such as a prediction stage or a transform stage. Accordingly, the encoder can further split the basic processing sub-unit into smaller segments (e.g., referred to as "prediction blocks" or "PBs" in H.265/HEVC or H.266/VVC), at the level of which a prediction operation can be performed. Similarly, the encoder can further split the basic processing sub-unit into smaller segments (e.g., referred to as "transform blocks" or "TBs" in H.265/HEVC or H.266/VVC), at the level of which a transform operation can be performed. The division schemes of the same basic processing sub-unit can be different at the prediction stage and the transform stage. For example, in H.265/HEVC or H.266/VVC, the prediction blocks (PBs) and transform blocks (TBs) of the same CU can have different sizes and numbers. Operations in the mode decision stage, the prediction stage, the transform stage will be detailed in later paragraphs with examples provided in FIG. 2 and FIG. 3.

In some implementations, to provide the capability of parallel processing and error resilience to video encoding and decoding, a picture can be divided into regions for processing, such that, for a region of the picture, the encoding or decoding process can depend on no information from any other region of the picture. In other words, regions of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." Different pictures of video sequence 100 can also have different partition schemes for dividing a picture into regions.

H.265/HEVC and H.266/VVC supports two modes of slices. In a raster-scan slice mode, a slice includes a sequence of tiles in a tile raster scan of a picture. In a rectangular slice mode, a slice includes one or more tiles that collectively form a rectangular region of the picture, or one or more consecutive CTU rows of one tile that collectively form a rectangular region of the picture. Tiles within a rectangular slice can be scanned in tile raster scan order within the rectangular region corresponding to that slice. For example, in FIG. 1, structure 110 is divided into 16 tiles (4 tile columns and 4 tile rows) and 3 raster-scan slices 114, 116, and 118, where the boundaries of which are shown as solid lines inside structure 110. Slice 114 includes four basic processing units. Slices 116 and 118 respectively include six basic processing units. In some embodiments, a subpicture may include one or more slices that collectively cover a rectangular region of the picture. It should be noted that the basic processing units, basic processing sub-units, and tiles and slices of structure 110 in FIG. 1 are only examples, and not meant to limit the present disclosure.

Figure 2:
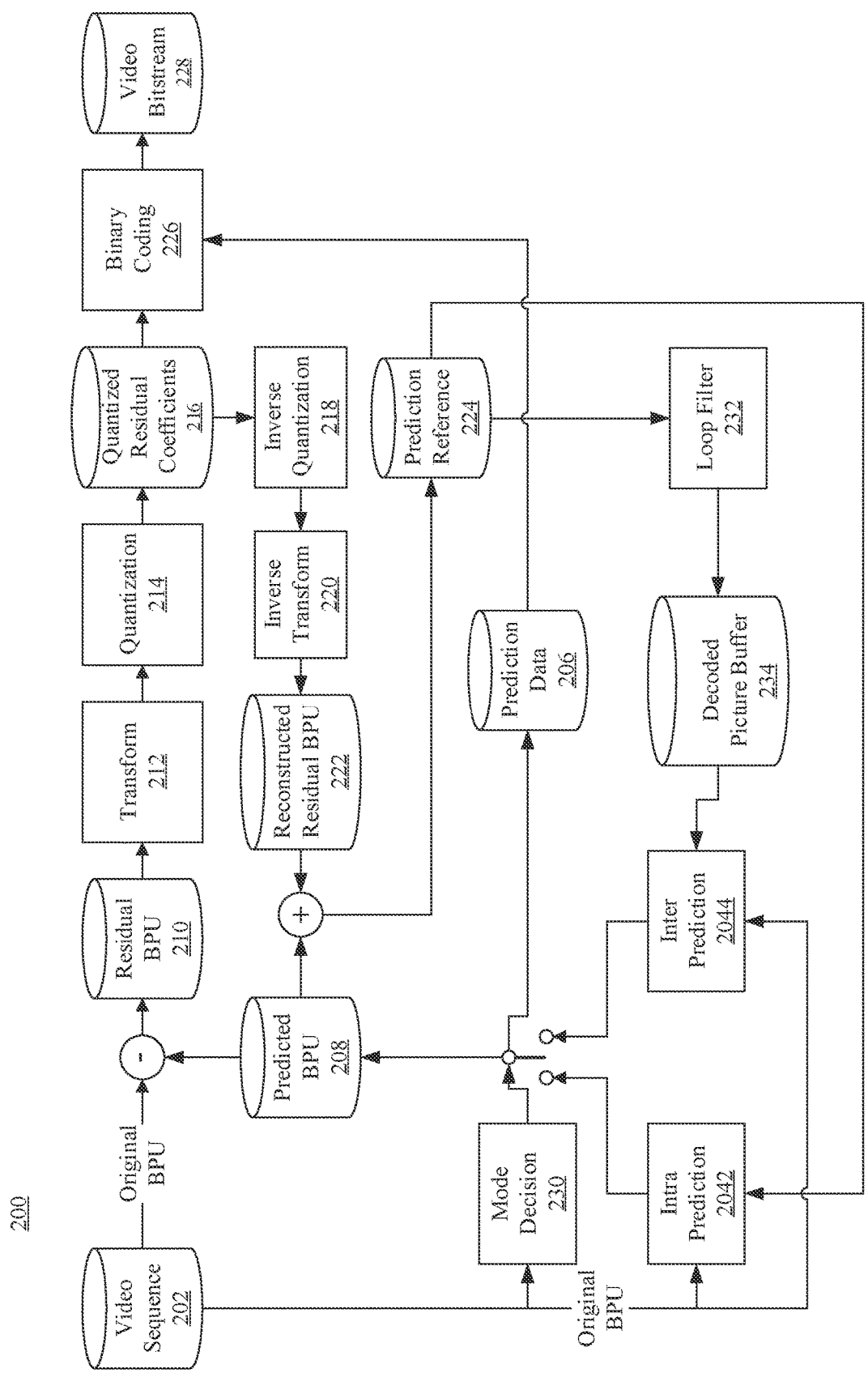
FIG. 2 illustrates a schematic diagram of an exemplary encoder in a hybrid video coding system, consistent with some embodiments of the present disclosure.

FIG. 2 illustrates a schematic diagram of an exemplary encoder 200 in a hybrid video coding system, (e.g., H.26x series), consistent with some embodiments of the disclosure. The input video is processed block by block. As discussed above, in VVC, a CTU is the largest block unit and can be as large as 128×128 luma samples (plus the corresponding chroma samples depending on the chroma format). One CTU may be further partitioned into CUs using quad-tree, binary tree, or ternary tree. Referring to FIG. 2, encoder 200 can receive video sequence 202 generated by a video capturing device (e.g., a camera). The term "receive" used herein can refer to receiving, inputting, acquiring, retrieving, obtaining, reading, accessing, or any action in any manner for inputting data. Encoder 200 can encode video sequence 202 into video bitstream 228. Similar to video sequence 100 in FIG. 1, video sequence 202 can include a set of pictures (referred to as "original pictures") arranged in a temporal order. Similar to structure 110 in FIG. 1, any original picture of video sequence 202 can be divided by encoder 200 into basic processing units, basic processing sub-units, or regions for processing. In some embodiments, encoder 200 can perform process at the level of basic processing units for original pictures of video sequence 202. For example, encoder 200 can perform process in FIG. 2 in an iterative manner, in which encoder 200 can encode a basic processing unit in one iteration of process. In some embodiments, encoder 200 can perform process in parallel for regions (e.g., slices 114-118 in FIG. 1) of original pictures of video sequence 202.

Components 202, 2042, 2044, 206, 208, 210, 212, 214, 216, 226, and 228 can be referred to as a "forward path." In FIG. 2, encoder 200 can feed a basic processing unit (referred to as an "original BPU") of an original picture of video sequence 202 to two prediction stages, intra prediction (also known as an "intra-picture prediction" or "spatial prediction") stage 2042 and inter prediction (also known as an "inter-picture prediction," "motion compensated prediction" or "temporal prediction") stage 2044 to perform a prediction operation and generate corresponding prediction data 206 and predicted BPU 208. Particularly, encoder 200 can receive the original BPU and prediction reference 224, which can be generated from the reconstruction path of the previous iteration of process.

The purpose of intra prediction stage 2042 and inter prediction stage 2044 is to reduce information redundancy by extracting prediction data 206 that can be used to reconstruct the original BPU as predicted BPU 208 from prediction data 206 and prediction reference 224. In some embodiments, an intra prediction can use pixels from one or more already coded neighboring BPUs in the same picture to predict the current BPU. That is, prediction reference 224 in the intra prediction can include the neighboring BPUs, so that spatial neighboring samples can be used to predict the current block. The intra prediction can reduce the inherent spatial redundancy of the picture.

In some embodiments, an inter prediction can use regions from one or more already coded pictures ("reference pictures") to predict the current BPU. That is, prediction reference 224 in the inter prediction can include the coded pictures. The inter prediction can reduce the inherent temporal redundancy of the pictures.

In the forward path, encoder 200 performs the prediction operation at intra prediction stage 2042 and inter prediction stage 2044. For example, at intra prediction stage 2042, encoder 200 can perform the intra prediction. For an original BPU of a picture being encoded, prediction reference 224 can include one or more neighboring BPUs that have been encoded (in the forward path) and reconstructed (in the reconstructed path) in the same picture. Encoder 200 can generate predicted BPU 208 by extrapolating the neighboring BPUs. The extrapolation technique can include, for example, a linear extrapolation or interpolation, a polynomial extrapolation or interpolation, or the like. In some embodiments, encoder 200 can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at inter prediction stage 2042, encoder 200 can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, encoder 200 can add reconstructed residual BPU 222 to predicted BPU 208 to generate a reconstructed BPU. When all reconstructed BPUs of the same picture are generated, encoder 200 can generate a reconstructed picture as a reference picture. Encoder 200 can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When encoder 200 identifies (e.g., by using a pel-recursive algorithm, a block-matching algorithm, or the like) a region similar to the original BPU in the search window, encoder 200 can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. Encoder 200 can record the direction and distance of such a motion as a "motion vector (MV)." When multiple reference pictures are used (e.g., as picture 106 in FIG. 1), encoder 200 can search for a matching region and determine its associated MV for each reference picture. In some embodiments, encoder 200 can assign weights to pixel values of the matching regions of respective matching reference pictures.

The motion estimation can be used to identify various types of motions, such as, for example, translations, rotations, zooming, or the like. For inter prediction, prediction data 206 can include, for example, reference index, locations (e.g., coordinates) of the matching region, MVs associated with the matching region, number of reference pictures, weights associated with the reference pictures, or other motion information.

For generating predicted BPU 208, encoder 200 can perform an operation of "motion compensation." The motion compensation can be used to reconstruct predicted BPU 208 based on prediction data 206 (e.g., the MV) and prediction reference 224. For example, encoder 200 can move the matching region of the reference picture according to the MV, in which encoder 200 can predict the original BPU of the current picture. When multiple reference pictures are used (e.g., as picture 106 in FIG. 1), encoder 200 can move the matching regions of the reference pictures according to the respective MVs and average pixel values of the matching regions. In some embodiments, if encoder 200 has assigned weights to pixel values of the matching regions of respective matching reference pictures, encoder 200 can add a weighted sum of the pixel values of the moved matching regions.

In some embodiments, the inter prediction can utilize uni-prediction or bi-prediction, and be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. In uni-prediction, only one MV pointing to one reference picture is used to generate the prediction signal for the current block.

On the other hand, bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at opposite temporal directions with respect to picture 104. In bi-prediction, two MVs, each pointing to its own reference picture, are used to generate the prediction signal of the current block. After video bitstream 228 is generated, MVs and reference indices can be sent in video bitstream 228 to a decoder, to identify where the prediction signal(s) of the current block come from.

For inter-predicted CUs, motion parameters may include MVs, reference picture indices and reference picture list usage index, or other additional information needed for coding features to be used. Motion parameters can be signaled in an explicit or implicit manner. When a CU is coded with a skip mode (i.e., its prediction residual is quantized and coded using a transform skip residual coding process), the CU is associated with one PU and has no significant residual coefficients, no coded MV delta or reference picture index. A merge mode can be specified, by which the motion parameters for the current CU are obtained from neighboring CUs, including both spatial and temporal candidates. In some embodiments, encoder 200 can apply the merge mode to any inter-predicted CU, including CUs coded with the skip mode and CUs coded with a non-skip mode. In some embodiments, encoder 200 can also signal MV(s), corresponding reference picture index for each reference picture list and reference picture list usage flag, or other information explicitly per each CU.

After intra prediction stage 2042 and inter prediction stage 2044, at mode decision stage 230, encoder 200 can select a prediction mode (e.g., one of the intra prediction or the inter prediction) for the current iteration of process. For example, encoder 200 can perform a rate-distortion optimization method, in which encoder 200 can select a prediction mode to minimize a value of a cost function depending on a bit rate of a candidate prediction mode and distortion of the reconstructed reference picture under the candidate prediction mode. Depending on the selected prediction mode, encoder 200 can generate the corresponding predicted BPU 208 (e.g., a prediction block) and prediction data 206.

In some embodiments, predicted BPU 208 can be identical to the original BPU. However, due to non-ideal prediction and reconstruction operations, predicted BPU 208 is generally slightly different from the original BPU. For recording such differences, after generating predicted BPU 208, encoder 200 can subtract it from the original BPU to generate residual BPU 210, which is also called a prediction residual.

For example, encoder 200 can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

After residual BPU 210 is generated, encoder 200 can feed residual BPU 210 to transform stage 212 and quantization stage 214 to generate quantized residual coefficients 216. To further compress residual BPU 210, at transform stage 212, encoder 200 can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, encoder 200 can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, encoder 200 and a corresponding decoder (e.g., decoder 300 in FIG. 3) can use the same transform algorithm (thus the same base patterns). Thus, encoder 200 can record only the transform coefficients, from which decoder 300 can reconstruct residual BPU 210 without receiving the base patterns from encoder 200. Compared with residual BPU 210, the transform coefficients can have fewer bits, but they can be used to reconstruct residual BPU 210 without significant quality deterioration. Thus, residual BPU 210 is further compressed.

Encoder 200 can further compress the transform coefficients at quantization stage 214. In the transform process, different base patterns can represent different variation frequencies (e.g., brightness variation frequencies). Because human eyes are generally better at recognizing low-frequency variation, encoder 200 can disregard information of high-frequency variation without causing significant quality deterioration in decoding. For example, at quantization stage 214, encoder 200 can generate quantized residual coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. Encoder 200 can disregard the zero-value quantized residual coefficients 216, by which the transform coefficients are further compressed. The quantization process is also invertible, in which quantized residual coefficients 216 can be reconstructed to the transform coefficients in an inverse operation of the quantization (referred to as "inverse quantization").

Because encoder 200 disregards the remainders of such divisions in the rounding operation, quantization stage 214 can be lossy. Typically, quantization stage 214 can contribute the most information loss in the encoding process. The larger the information loss is, the fewer bits the quantized residual coefficients 216 can need. For obtaining different levels of information loss, encoder 200 can use different values of the quantization parameter or any other parameter of the quantization process.

Encoder 200 can feed prediction data 206 and quantized residual coefficients 216 to binary coding stage 226 to generate video bitstream 228 to complete the forward path. At binary coding stage 226, encoder 200 can encode prediction data 206 and quantized residual coefficients 216 using a binary coding technique, such as, for example, entropy coding, variable length coding, arithmetic coding, Huffman coding, context-adaptive binary arithmetic coding (CABAC), or any other lossless or lossy compression algorithm.

For example, the encoding process of CABAC in binary coding stage 226 may include a binarization step, a context modeling step, and a binary arithmetic coding step. If the syntax element is not binary, encoder 200 first maps the syntax element to a binary sequence. Encoder 200 may select a context coding mode or a bypass coding mode for coding. In some embodiments, for context coding mode, the probability model of the bin to be encoded is selected by the "context", which refers to the previous encoded syntax elements. Then the bin and the selected context model is passed to an arithmetic coding engine, which encodes the bin and updates the corresponding probability distribution of the context model. In some embodiments, for the bypass coding mode, without selecting the probability model by the "context," bins are encoded with a fixed probability (e.g., a probability equal to 0.5). In some embodiments, the bypass coding mode is selected for specific bins in order to speed up the entropy coding process with negligible loss of coding efficiency.

In some embodiments, in addition to prediction data 206 and quantized residual coefficients 216, encoder 200 can encode other information at binary coding stage 226, such as, for example, the prediction mode selected at the prediction stage (e.g., intra prediction stage 2042 or inter prediction stage 2044), parameters of the prediction operation (e.g., intra prediction mode, motion information, etc.), a transform type at transform stage 212, parameters of the quantization process (e.g., quantization parameters), an encoder control parameter (e.g., a bitrate control parameter), or the like. That is, coding information can be sent to binary coding stage 226 to further reduce the bit rate before being packed into video bitstream 228. Encoder 200 can use the output data of binary coding stage 226 to generate video bitstream 228. In some embodiments, video bitstream 228 can be further packetized for network transmission.

Components 218, 220, 222, 224, 232, and 234 can be referred to as a "reconstruction path." The reconstruction path can be used to ensure that both encoder 200 and its corresponding decoder (e.g., decoder 300 in FIG. 3) use the same reference data for prediction.

During the process, after quantization stage 214, encoder 200 can feed quantized residual coefficients 216 to inverse quantization stage 218 and inverse transform stage 220 to generate reconstructed residual BPU 222. At inverse quantization stage 218, encoder 200 can perform inverse quantization on quantized residual coefficients 216 to generate reconstructed transform coefficients. At inverse transform stage 220, encoder 200 can generate reconstructed residual BPU 222 based on the reconstructed transform coefficients. Encoder 200 can add reconstructed residual BPU 222 to predicted BPU 208 to generate prediction reference 224 to be used in prediction stages 2042, 2044 for the next iteration of process.

In the reconstruction path, if intra prediction mode has been selected in the forward path, after generating prediction reference 224 (e.g., the current BPU that has been encoded and reconstructed in the current picture), encoder 200 can directly feed prediction reference 224 to intra prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), encoder 200 can feed prediction reference 224 to loop filter stage 232, at which encoder 200 can apply a loop filter to prediction reference 224 to reduce or eliminate distortion (e.g., blocking artifacts) introduced by the inter prediction. Encoder 200 can apply various loop filter techniques at loop filter stage 232, such as, for example, deblocking, sample adaptive offsets (SAO), adaptive loop filters (ALF), or the like. In SAO, a nonlinear amplitude mapping is introduced within the inter prediction loop after the deblocking filter to reconstruct the original signal amplitudes with a look-up table that is described by a few additional parameters determined by histogram analysis at the encoder side.

The loop-filtered reference picture can be stored in buffer 234 (or "decoded picture buffer") for later use (e.g., to be used as an inter-prediction reference picture for a future picture of video sequence 202). Encoder 200 can store one or more reference pictures in buffer 234 to be used at inter prediction stage 2044. In some embodiments, encoder 200 can encode parameters of the loop filter (e.g., a loop filter strength) at binary coding stage 226, along with quantized residual coefficients 216, prediction data 206, and other information.

Encoder 200 can perform the process discussed above iteratively to encode each original BPU of the original picture (in the forward path) and generate prediction reference 224 for encoding the next original BPU of the original picture (in the reconstruction path). After encoding all original BPUs of the original picture, encoder 200 can proceed to encode the next picture in video sequence 202.

It should be noted that other variations of the encoding process can be used to encode video sequence 202. In some embodiments, stages of process can be performed by encoder 200 in different orders. In some embodiments, one or more stages of the encoding process can be combined into a single stage. In some embodiments, a single stage of the encoding process can be divided into multiple stages. For example, transform stage 212 and quantization stage 214 can be combined into a single stage. In some embodiments, the encoding process can include additional stages that are not shown in FIG. 2. In some embodiments, the encoding process can omit one or more stages in FIG. 2.

For example, in some embodiments, encoder 200 can be operated in a transform skipping mode. In the transform skipping mode, transform stage 212 is bypassed and a transform skip flag is signaled for the TB. This may improve compression for some types of video content such as computer-generated images or graphics mixed with camera-view content (e.g., scrolling text). In addition, encoder 200 can also be operated in a lossless mode. In the lossless mode, transform stage 212, quantization stage 214, and other processing that affects the decoded picture (e.g., SAO and deblocking filters) are bypassed. The residual signal from the intra prediction stage 2042 or inter prediction stage 2044 is fed into binary coding stage 226, using the same neighborhood contexts applied to the quantized transform coefficients. This allows mathematically lossless reconstruction. Therefore, in H.265/HEVC and H.266/VVC, both transform and transform skip residual coefficients are coded within non-overlapped CGs. That is, each CG may include one or more transform residual coefficients, or one or more transform skip residual coefficients.

Figure 3:
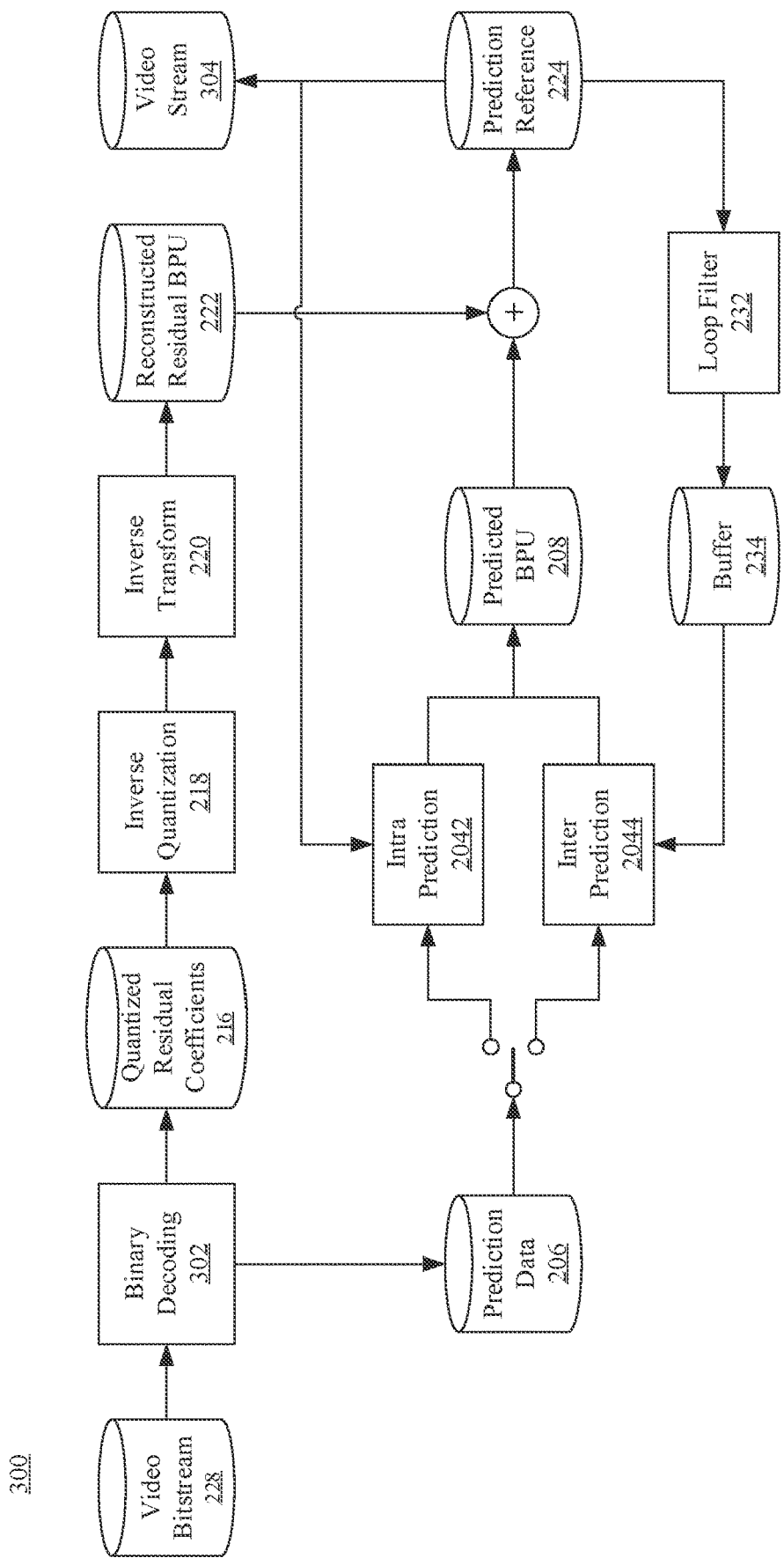
FIG. 3 illustrates a schematic diagram of an exemplary decoder in a hybrid video coding system, consistent with some embodiments of the present disclosure.

FIG. 3 illustrates a block diagram of an exemplary decoder 300 of a hybrid video coding system (e.g., H.26x series), consistent with some embodiments of the disclosure. Decoder 300 can perform a decompression process corresponding to the compression process in FIG. 2. The corresponding stages in the compression process and decompression process are labeled with the same numbers in FIG. 2 and FIG. 3.

In some embodiments, the decompression process can be similar to the reconstruction path in FIG. 2. Decoder 300 can decode video bitstream 228 into video stream 304 accordingly. Video stream 304 can be very similar to video sequence 202 in FIG. 2. However, due to the information loss in the compression and decompression process (e.g., quantization stage 214 in FIG. 2), video stream 304 may be not identical to video sequence 202. Similar to encoder 200 in FIG. 2, decoder 300 can perform the decoding process at the level of basic processing units (BPUs) for each picture encoded in video bitstream 228. For example, decoder 300 can perform the process in an iterative manner, in which decoder 300 can decode a basic processing unit in one iteration. In some embodiments, decoder 300 can perform the decoding process in parallel for regions (e.g., slices 114-118) of each picture encoded in video bitstream 228.

In FIG. 3, decoder 300 can feed a portion of video bitstream 228 associated with a basic processing unit (referred to as an "encoded BPU") of an encoded picture to binary decoding stage 302. At binary decoding stage 302, decoder 300 can unpack and decode video bitstream into prediction data 206 and quantized residual coefficients 216. Decoder 300 can use prediction data 206 and quantized residual coefficients to reconstruct video stream 304 corresponding to video bitstream 228.

Decoder 300 can perform an inverse operation of the binary coding technique used by encoder 200 (e.g., entropy coding, variable length coding, arithmetic coding, Huffman coding, context-adaptive binary arithmetic coding, or any other lossless compression algorithm) at binary decoding stage 302. In some embodiments, in addition to prediction data 206 and quantized residual coefficients 216, decoder 300 can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, decoder 300 can depacketize video bitstream 228 before feeding it to binary decoding stage 302.

Decoder 300 can feed quantized residual coefficients 216 to inverse quantization stage 218 and inverse transform stage 220 to generate reconstructed residual BPU 222. Decoder 300 can feed prediction data 206 to intra prediction stage 2042 and inter prediction stage 2044 to generate predicted BPU 208. Particularly, for an encoded basic processing unit (referred to as a "current BPU") of an encoded picture (referred to as a "current picture") that is being decoded, prediction data 206 decoded from binary decoding stage 302 by decoder 300 can include various types of data, depending on what prediction mode was used to encode the current BPU by encoder 200. For example, if intra prediction was used by encoder 200 to encode the current BPU, prediction data 206 can include coding information such as a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by encoder 200 to encode the current BPU, prediction data 206 can include coding information such as a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more MVs respectively associated with the matching regions, or the like.

Accordingly, the prediction mode indicator can be used to select whether inter or intra prediction module will be invoked. Then, parameters of the corresponding prediction operation can be sent to the corresponding prediction module to generate the prediction signal(s). Particularly, based on the prediction mode indicator, decoder 300 can decide whether to perform an intra prediction at intra prediction stage 2042 or an inter prediction at inter prediction stage 2044. The details of performing such intra prediction or inter prediction are described in FIG. 2 and will not be repeated hereinafter. After performing such intra prediction or inter prediction, decoder 300 can generate predicted BPU 208.

After predicted BPU 208 is generated, decoder 300 can add reconstructed residual BPU 222 to predicted BPU 208 to generate prediction reference 224. In some embodiments, prediction reference 224 can be stored in a buffer (e.g., a decoded picture buffer in a computer memory). Decoder 300 can feed prediction reference 224 to intra prediction stage 2042 and inter prediction stage 2044 for performing a prediction operation in the next iteration.

For example, if the current BPU is decoded using the intra prediction at intra prediction stage 2042, after generating prediction reference 224 (e.g., the decoded current BPU), decoder 300 can directly feed prediction reference 224 to intra prediction stage 2042 for later usage (e.g., for extrapolation of a next BPU of the current picture). If the current BPU is decoded using the inter prediction at inter prediction stage 2044, after generating prediction reference 224 (e.g., a reference picture in which all BPUs have been decoded), decoder 300 can feed prediction reference 224 to loop filter stage 232 to reduce or eliminate distortion (e.g., blocking artifacts). In addition, prediction data 206 can further include parameters of a loop filter (e.g., a loop filter strength). Accordingly, decoder 300 can apply the loop filter to prediction reference 224, in a way as described in FIG. 2. For example, loop filters such as deblocking, SAO and/or ALF may be applied to form the loop-filtered reference picture, which are stored in buffer 234 (e.g., a decoded picture buffer (DPB) in a computer memory) for later use (e.g., to be used at inter prediction stage 2044 for prediction of a future encoded picture of video bitstream 228). In some embodiments, reconstructed pictures from buffer 234 can also be sent to a display, such as a TV, a PC, a smartphone, or a tablet to be viewed by the end-users.

Decoder 300 can perform the decoding process iteratively to decode each encoded BPU of the encoded picture and generate prediction reference 224 for encoding the next encoded BPU of the encoded picture. After decoding all encoded BPUs of the encoded picture, decoder 300 can output the picture to video stream 304 for display and proceed to decode the next encoded picture in video bitstream 228.

Figure 4:
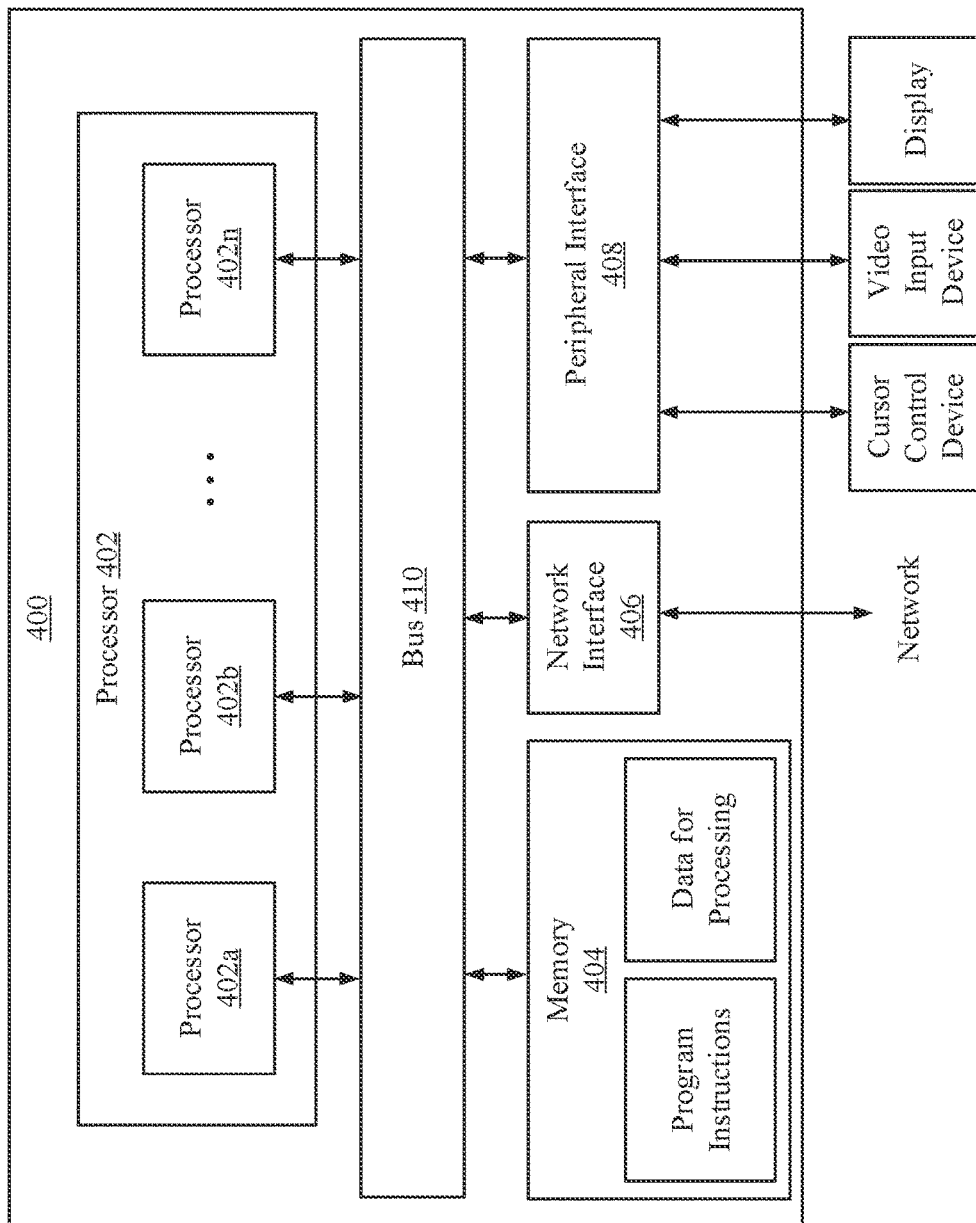
FIG. 4 illustrates a block diagram of an exemplary apparatus for encoding or decoding a video, consistent with some embodiments of this disclosure.

FIG. 4 is a block diagram of an exemplary apparatus 400 for encoding and/or decoding a video, according to some embodiments of this disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 and FIG. 3) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process of encoder 200 or decoder 300) can be implemented as any combination of any software or hardware modules in apparatus 400. For example, some or all stages of process encoder 200 or decoder 300 can be implemented as one or more software modules of apparatus 400, such as program instructions that can be loaded into memory 404. For another example, some or all stages of process encoder 200 or decoder 300 can be implemented as one or more hardware modules of apparatus 400, such as a specialized data processing circuit (e.g., an FPGA, an ASIC, an NPU, or the like).

In HEVC and VVC, a merge mode enables motion data (e.g., prediction direction, reference index, MVs, etc.) to be inherited from a spatial or temporal (co-located) neighbor. A list of merge candidates can be generated from these neighbors. A merge flag can be signaled to indicate whether merge is used in a given prediction unit (PU). In some embodiments, in order to increase the accuracy of the MVs of the merge mode, encoder 200 or decoder 300 may apply a bilateral-matching (BM) based decoder side motion vector refinement (DMVR) in the bi-prediction operation.

Figure 5:
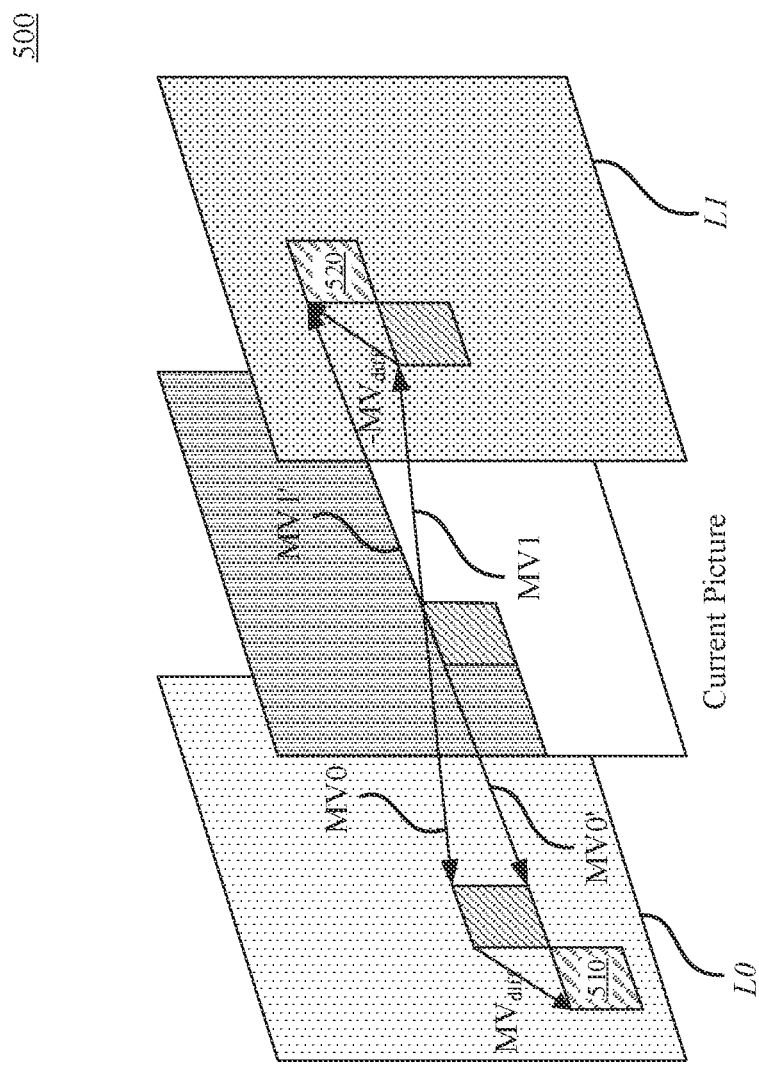
FIG. 5 illustrates an example of decoder-side motion vector refinement (DMVR), consistent with some embodiments of the present disclosure.

Reference is made to FIG. 5, which illustrates an example of decoder side motion vector refinement (DMVR) 500, consistent with some embodiments of present disclosure. As illustrated in FIG. 5, in the bi-prediction operation, a refined MV (e.g., MV0' or MV1') can be searched around the initial MVs (e.g., MV0 or MV1) in a reference picture list L0 and another reference picture list L1. The bilateral-matching method calculates a distortion between the two candidate blocks (e.g., blocks 510 and 520) in reference pictures list L0 and L1. As illustrated in FIG. 5, a sum of absolute difference (SAD) between blocks 510 and 520 based on each MV candidate around the initial MV (e.g., MV0 or MV1) is calculated. The MV candidate with the lowest SAD becomes the refined MV and can be used to generate the bi-predicted signal. In some embodiments, the DMVR can be applied to CUs that satisfy following conditions: (1) CU level merge mode with bi-prediction MV; (2) BCW weight index indicates equal weight for bi-prediction MVs (e.g., bi-prediction with weighted averaging (BWA) is not enabled for the CU); (3) one reference picture is in the past and another reference picture is in the future with respect to the current picture; (4) the distances (i.e. picture order count (POC) difference) from each of the two reference pictures to the current picture are the same; and (5) the CU has more than 64 luma samples, and the CU width and the CU height are larger than or equal to 8 luma samples.

The refined MV derived by DMVR process can be used to generate the inter prediction samples and also used in temporal motion vector prediction for coding future pictures, while the original MV is used in deblocking process and also used in spatial motion vector prediction for future CU coding within the current picture.

The additional features of DMVR will be discussed in the following description. As shown in FIG. 5, the search points surround the initial MV and the MV offset obey the MV difference mirroring rule. In other words, any points that are checked by DMVR, denoted by candidate MV pair (MV0, MV1) obey the following two equations:

$$MV0'=MV0+MV\_\text{offset} \qquad \text{Eq. 1}$$

$$MV1'=MV1-MV\_\text{offset} \qquad \text{Eq. 2}$$

where MV_offset represents the refinement offset between the initial MV and the refined MVs. Note that MV_offset is a vector with motion displacements in the X and Y dimensions. In some embodiments, the refinement search range is two integer luma samples from the initial MV in both horizontal and vertical dimensions.

Figure 6:
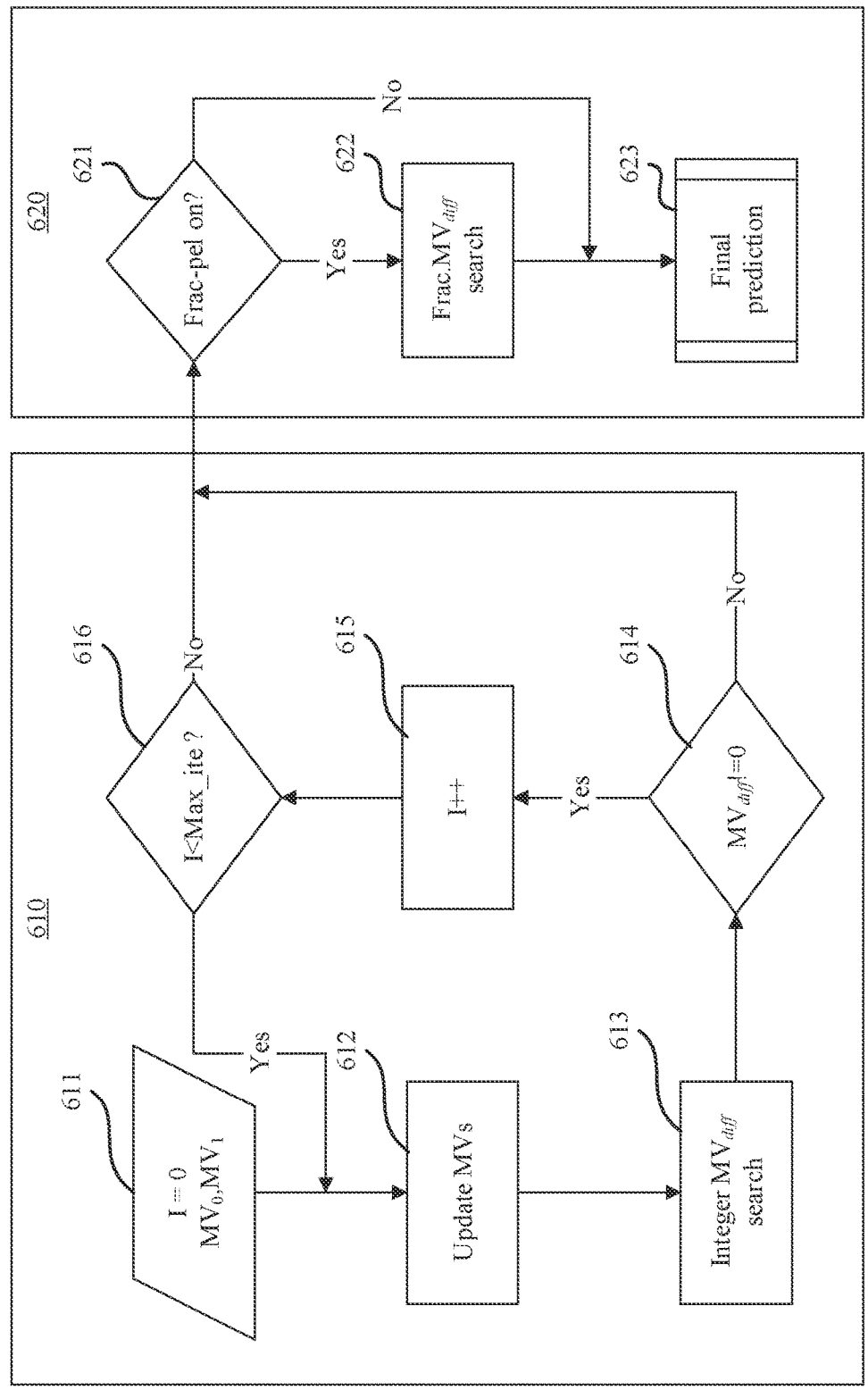
FIG. 6. illustrates a schematic diagram of an exemplary DMVR searching procedure, consistent with some embodiments of the present disclosure.

FIG. 6 illustrates an exemplary DMVR searching procedure 600 consistent with some embodiments of present disclosure. As shown in FIG. 6, the searching includes an integer sample offset search stage 610 and a fractional sample refinement stage 620. To reduce the search complexity, integer sample offset search stage 610 can apply a fast searching method with early termination mechanism. Instead of a 25-points full search, a 2-iteration search scheme is applied to reduce the SAD check points.

In some embodiments, integer sample offset search stage 610 includes processes 611-616. In process 611, DMVR initializes a counter value to 0, and obtains initial MVs (e.g., MV0 and MV1). In process 612, DMVR updates the MVs. In process 613, DMVR performs the integer MV difference search. In process 614, DMVR determines whether the obtained integer MV difference is zero. If the obtained integer MV difference is not zero, DMVR increases the counter value by 1 in process 615 and checks whether the counter value exceeds the maximum iteration limit in process 616. If the updated counter value is within the limit, DMVR iteratively performs processes 612-616. If the obtained integer MV difference is zero (process 614—No) or the maximum iteration limit is reached (process 616—No), DMVR terminates integer sample offset search stage 610 and enters fractional sample refinement stage 620. Fractional sample refinement stage 620 includes processes 621-623. In process 621, DMVR determines whether a fractional pixel refinement is enabled. If the fractional pixel refinement is enabled (process 621—Yes), in process 622, DMVR performs the fractional MV difference search. Then, in process 623, DMVR performs the final prediction based on the result of the fractional MV difference search. If the fractional pixel refinement is disabled (process 621—No), process 622 is bypassed and DMVR performs the final prediction in process 623 directly based on the result obtained in integer sample offset search stage 610.

FIG. 7 illustrates an example of DMVR integer luma sample searching pattern 700, consistent with some embodiments of present disclosure. As shown in FIG. 7, a DMVR searching procedure checks a maximum of 6 SADs in a first iteration and compares SADs of five points (center position P0 and positions P1~P4). If the SAD of the center position is the smallest SAD, the integer sample stage is terminated. Otherwise, DMVR searching procedure checks one more position point P5, which is determined by the SAD distribution of positions P1~P4, and selects one of the positions P1-P5 with the smallest SAD as a center position for a second iteration search. In some embodiments, the process of the second iteration search is the same as that of the first iteration search. The SADs calculated in the first iteration can be re-used in the second iteration. That is, only SADs of 3 additional points may need to be further calculated in the second iteration.

Figure 8:
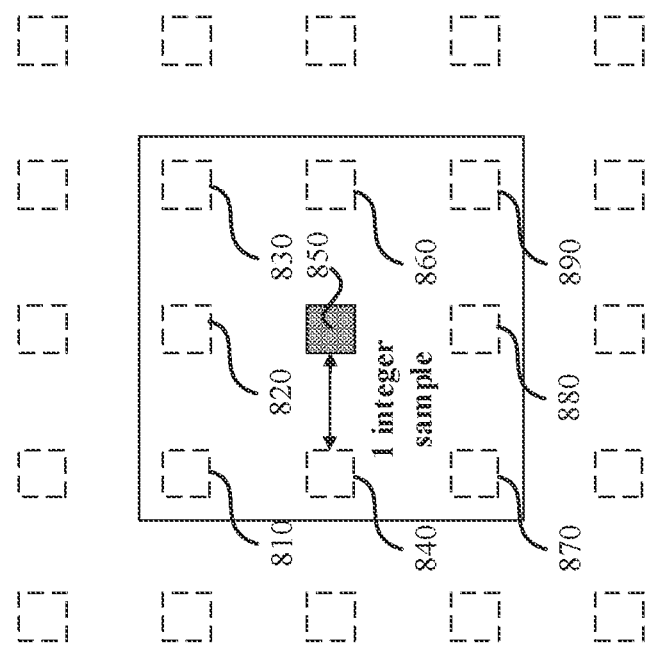
FIG. 8 illustrates a schematic diagram of an exemplary DMVR integer sample offset search stage, consistent with some embodiments of the present disclosure.

FIG. 8 is a schematic diagram illustrating an exemplary DMVR integer sample offset search stage 800, consistent with some embodiments of the present disclosure. As shown in FIG. 8, in some embodiments, SAD values of 25 points are calculated in integer sample offset search stage 800. Moreover, DMVR flavors an initial MV (e.g., point 850) by decreasing the SAD value of point 850 by one quarter. The integer sample search stage can be followed by a fractional sample refinement stage (e.g., fractional sample refinement stage 620 in FIG. 6). DMVR can further refine the position with the smallest SAD in the fractional sample refinement stage. In some embodiments, DMVR can invoke fractional sample refinement stage conditionally based on the position with the smallest SAD value. For example, if the position with the smallest SAD value is one of nine points 810-890 around the initial MV (e.g., point 850), DMVR further applies the fractional sample refinement stage, and outputs the refined MV for this searching process. Otherwise, the position with the smallest SAD value can be used as the output of this searching process, without enabling the fractional sample refinement stage.

To reduce the computational complexity, the fractional sample refinement process can be derived by using a parametric error surface equation, instead of additional searches with the SAD value comparison. As described above, in some embodiments, the fractional sample refinement stage is conditionally invoked based on the output of the integer sample search stage. When the integer sample search stage is terminated with the center position having the smallest SAD value in either the first iteration search or the second iteration search, DMVR can further apply the fractional sample refinement stage.

Figure 9:
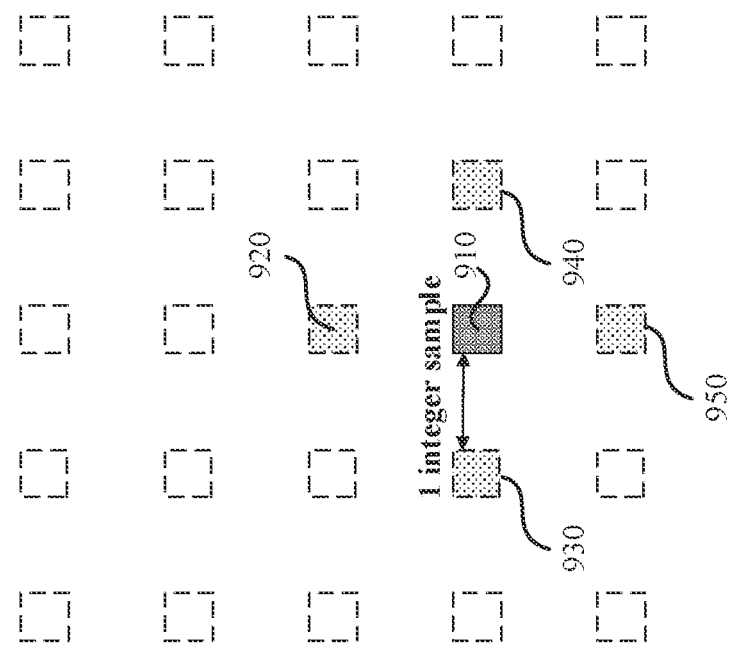
FIG. 9 illustrates a schematic diagram of an exemplary DMVR parametric error surface estimation, consistent with some embodiments of the present disclosure.

FIG. 9 is a schematic diagram illustrating an exemplary DMVR parametric error surface estimation 900, consistent with some embodiments of present disclosure. As shown in FIG. 9, in parametric error surface based sub-pixel offsets estimation, the cost at the center position cost and the costs at four neighboring positions from the center can be used to fit a 2-dimentional parabolic error surface equation as follows:

$$E(x,y)=((A(x-x_{min})^2+B(y-y_{min})^2+)>>\text{mvShift})+E(0,0) \qquad \text{Eq. 3}$$

where $(x_{min}, y_{min})$ corresponds to the fractional position with the least cost and E (x, y) corresponds to the cost of center (e.g., point 910) with the smallest SAD value and four neighboring points 920-950, and mvShift is a preset value. For example, mvShift may be set to 4, where the accuracy of the MV is $\frac{1}{16}$-pel resolution. In some embodiments, the value A and B can be determined based on the following equations:

$$A = \frac{E(-1, 0) + E(1, 0) - 2E(0, 0)}{2} \qquad \text{Eq. 4}$$

$$B = \frac{E(0, -1) + E(0, 1) - 2E(0, 0)}{2} \qquad \text{Eq. 5}$$

By solving the above equations using cost values of the five search points 910-950, the fractional position with the least cost can be determined based on the following equations:

$$x_{min}=((E(-1,0)-E(1,0))<<\text{mvShift})/(2(E(-1,0)+E(1,0)-2E(0,0))) \qquad \text{Eq. 6}$$

$$y_{min}=((E(0,-1)-E(0,1))<<\text{mvShift})/(2((E(0,-1)+E(0,1)-2E(0,0))) \qquad \text{Eq. 7}$$

In some embodiments, corresponding to half-pel offset with $\frac{1}{16}$th-pel MV accuracy, the value of $x_{min}$ and $y_{min}$ are constrained to be between −8 and 8 (in $\frac{1}{16}$ sample precision), because cost values are positive and the smallest value is E(0,0). The computed fractional position $(x_{min}, y_{min})$ can be added to the MV obtained in the integer distance refinement stage to get the refinement MV with sub-pel accuracy.

In some embodiments, a bi-directional optical flow (BDOF, also referred to as BIO) tool is included in VVC. BDOF has been included in the JEM software. Compared to the BDOF of the JEM version, in some embodiments of the present disclosure, the BDOF is simplified and requires less computation, in terms of number of multiplications and the size of the multiplier used in the BDOF.

BDOF can be used to refine the bi-prediction signal of a CU at a 4×4 sub-block level. In some cases, BDOF can be applied to a CU if it satisfies the following conditions: (1) the CU's height is not 4, and the CU is not in size of 4×8; (2) the CU is not coded using affine modes or an advanced temporal motion vector predictor (ATMVP) merge mode; and (3) the CU is coded using a "true" bi-prediction mode, which means that one of the two reference pictures is prior to the current picture in display order and the other is after the current picture in display order. BDOF is applied to the luma component. ATMVP refers to a method for correcting temporal similarity information using spatial similarity information, which increases the accuracy of the Col block in a temporal motion vector predictor (TMVP) method. The BDOF mode is based on the concept of optical flow, which assumes that the motion of an object is smooth. For example, for each 4×4 sub-block, a motion refinement ($v_x$, $v_y$) is calculated by minimizing the difference between the L0 and L1 prediction samples. The calculated motion refinement is used to adjust the bi-predicted sample values in the 4×4 sub-block. Steps applied in the BDOF process will be discussed in the following paragraphs.

First, horizontal and vertical gradients $$\left(\frac{\partial I^{(k)}}{\partial x}(i,j) \text{ and } \frac{\partial I^{(k)}}{\partial y}(i,j), k = 0, 1\right)$$

of the two prediction signals are determined by calculating a difference between two neighboring samples based on the following equations:

$$\frac{\partial I^{(k)}}{\partial x}(i,j) = \left(I^{(k)}(i+1,j) - I^{(k)}(i-1,j)\right) \gg shift1 \qquad \text{Eq. 8}$$

$$\frac{\partial I^{(k)}}{\partial y}(i,j) = \left(I^{(k)}(i,j+1) - I^{(k)}(i,j-1)\right) \gg shift1 \qquad \text{Eq. 9}$$

where $I^{(k)}(i, j)$ is the sample value at coordinate $(i, j)$ of the prediction signal in list k, where k=0,1, and shift1 is calculated based on the luma bit depth(bitDepth), as shift1=max(2, 14-bitDepth).

Then, the autocorrelation and cross-correlation of the gradients $S_1$, $S_2$, $S_3$, $S_5$ and $S_6$ can be determined based on the following equations:

$$S_1 = \sum_{(i,j)\in\Omega} \psi_x(i,j) \cdot \psi_x(i,j) \qquad \text{Eq. 10}$$

$$S_2 = \sum_{(i,j)\in\Omega} \psi_x(i,j) \cdot \psi_y(i,j) \qquad \text{Eq. 11}$$

$$S_3 = \sum_{(i,j)\in\Omega} \theta(i,j) \cdot \psi_x(i,j) \qquad \text{Eq. 12}$$

$$S_5 = \sum_{(i,j)\in\Omega} \psi_y(i,j) \cdot \psi_y(i,j) \qquad \text{Eq. 13}$$

$$S_6 = \sum_{(i,j)\in\Omega} \theta(i,j) \cdot \psi_y(i,j) \qquad \text{Eq. 14}$$

where, $$\psi_x(i,j) = \left(\frac{\partial I^{(1)}}{\partial x}(i,j) + \frac{\partial I^{(0)}}{\partial x}(i,j)\right) \gg n_a \qquad \text{Eq. 15}$$

$$\psi_y(i,j) = \left(\frac{\partial I^{(1)}}{\partial y}(i,j) + \frac{\partial I^{(0)}}{\partial y}(i,j)\right) \gg n_a \qquad \text{Eq. 16}$$

$$\theta(i,j) = \left(I^{(1)}(i,j) \gg n_b\right) - \left(I^{(0)}(i,j) \gg n_b\right) \qquad \text{Eq. 17}$$

where $\Omega$ is a 6×6 window around the 4×4 sub-block, and the values of $n_a$ and $n_p$ are set to min(5, bitDepth−7) and min(8, bitDepth−4), respectively.

The motion refinement ($v_x$, $v_y$) can be derived based on the cross-correlation and autocorrelation terms using the following equations:

$$v_x = S_1 > 0 ? clip3(-th'_{BIO}, th'_{BIO}, -(S_3 \cdot 2^{n_b-n_a}) \gg \lfloor \log_2 S_1 \rfloor) : 0 \qquad \text{Eq. 18}$$

$$v_y = S_5 > 0 ? clip3\big(-th'_{BIO}, th'_{BIO}, -((S_6 \cdot 2^{n_b-n_a} - \\ ((v_x S_{2,m}) \ll n_{S_2} + v_x S_{2,s})/2) \gg \lfloor \log_2 S_5 \rfloor)\big) : 0 \qquad \text{Eq. 19}$$

where $S_{2,m} = S_2 \gg n_{S_2}$, $S_{2,s} = S_2 \& (2^{n_{S_2}} - 1)$, $th'_{BIO} = 2^{13-BD}$. $\lfloor \cdot \rfloor$ is the floor function, and $n_{S_2} = 12$.

Based on the motion refinement and the gradients, the following adjustment can be determined for each sample in the 4×4 sub-block based on the following equation:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \\ rnd\left(\left(v_y\left(\frac{\partial I^{(1)}(x,y)}{\partial y} - \frac{\partial I^{(0)}(x,y)}{\partial y}\right)\right)/2\right) \qquad \text{Eq. 20}$$

BDOF samples of the CU can be determined based on adjusting the bi-prediction samples according to the following equation:

$$\text{pred}_{BDOF}(x,y) = (I^{(0)}(x,y) + I^{(1)}(x,y) + b(x,y) + o_{offset}) \gg shift \qquad \text{Eq. 21}$$

These values are selected such that the multipliers in the BDOF process do not exceed an upper limit (e.g., 15-bit), and the maximum bit-width of the intermediate parameters in the BDOF process is kept within a maximum value (e.g., 32-bit).

Figure 10:
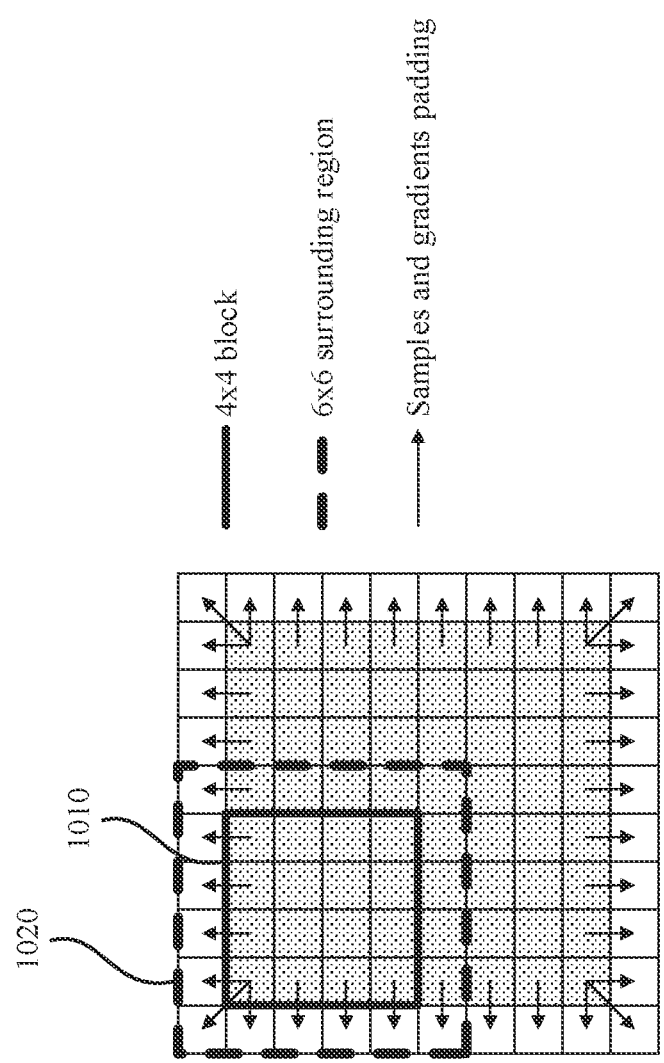
FIG. 10 illustrates an example of extended coding unit (CU) region used in bi-directional optical flow (BDOF), consistent with some embodiments of the present disclosure.

To derive the gradient values, some prediction samples $I^{(k)}(i, j)$ in list k (k=0,1) outside of the current CU boundaries are generated. FIG. 10 is a schematic diagram of an example of extended CU region used in the BDOF process, consistent with some embodiments of present disclosure. As depicted in FIG. 10, CU 1000 includes one or more 4×4 blocks (e.g., block 1010 illustrated in the solid-line rectangle). A 6×6 block surrounding region 1020 corresponding to block 1010 is illustrated in the dotted-line rectangle, where the BDOF can use one extended row/column around the boundaries of CU 1000 for the 6×6 block surrounding region 1020. To control the computational complexity of generating the out-of-boundary prediction samples, prediction samples in the extended area (shown as white squares in FIG. 10) can be generated by taking the reference samples at the nearby integer positions (e.g., using a floor operation on the coordinates) without interpolation. A normal 8-tap motion compensation interpolation filter can be used to generate prediction samples within CU 1000 (shown as squares filled with patterns in FIG. 10). In some embodiments, these extended sample values may be used in gradient calculation only, but the present disclosure is not limited thereto. For remaining steps in the BDOF process, sample and gradient values outside of the CU boundaries can be padded or repeated from their nearest neighbors as denoted by arrows in FIG. 10, if any of them are required.

In some embodiments, a coding tool called prediction refinement with optical flow (PROF) can be adopted. PROF improves the affine motion compensated prediction accuracy by refining the sub-block based affine motion compensated prediction with optical flow. Affine motion model parameters can be used to derive the motion vector of each sample position in a CU. Due to the high complexity and memory access bandwidth for generating sample-by-sample affine motion compensated prediction, in some embodiments, the affine prediction uses a sub-block based affine motion compensation method. For example, a CU can be divided into 4×4 sub-blocks. These sub-blocks are assigned corresponding MVs derived from the affine CU's control-point MVs. The sub-block based affine motion compensation is a trade-off between coding efficiency, complexity, and memory access bandwidth. It loses some prediction accuracy due to sub-block-based prediction instead of the theoretical sample-based motion compensated prediction.

To achieve a finer granularity of affine motion compensation, the PROF process can be applied after a regular subblock based affine motion compensation. For example, a sample-based refinement is derived based on the following optical flow equation:

$$\Delta I(i,j) = g_x(i,j) * \Delta v_x(i,j) + g_y(i,j) * \Delta v_y(i,j) \qquad \text{Eq. 22}$$

where $g_x(i,j)$ and $g_y(i,j)$ are spatial gradients at a sample position (i, j), and $\Delta v$ is the motion offset from the sub-block based motion vector to the sample-based motion vector derived from the affine model parameters.

Figure 11:
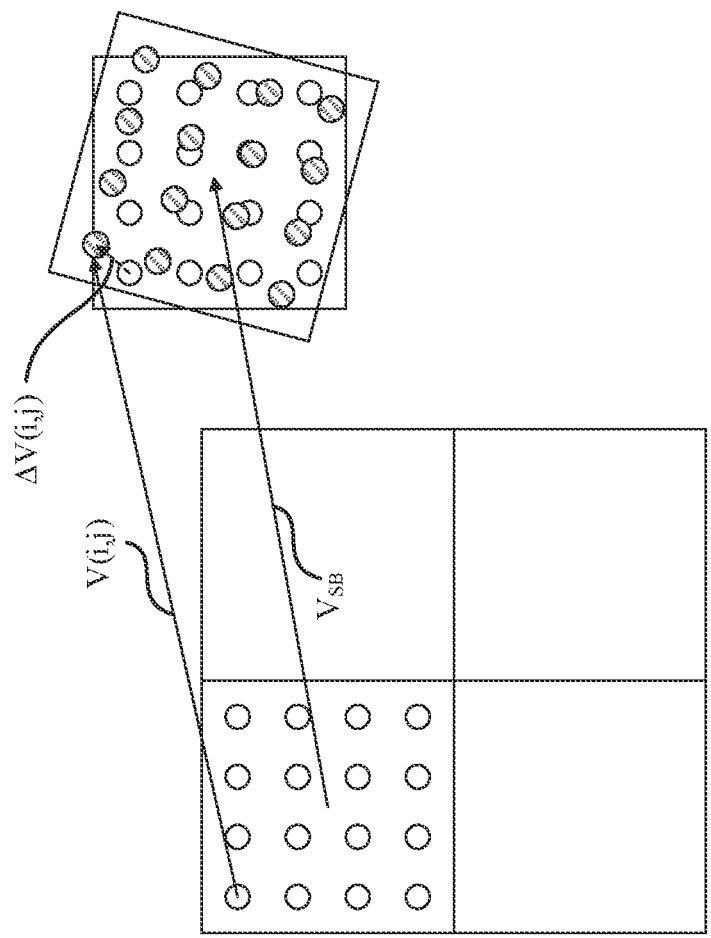
FIG. 11 illustrates an example of sub-block based affine motion and sample-based affine motion, according to some embodiments of the present disclosure.

FIG. 11 is a schematic diagram of an example of sub-block based affine motion and sample-based affine motion 1100, consistent with some embodiments of the present disclosure. In FIG. 11, V(i,j) denotes the theoretical motion vector for the sample position (i, j) derived using the affine model, $V_{SB}$ denotes the subblock based motion vector, and $\Delta V(i,j)$ denotes the difference between V(i,j) and $V_{SB}$, as depicted by the dotted arrow in FIG. 11.

The PROF can add the prediction refinement $\Delta I(i, j)$ derived from the optical flow equation above to a sub-block prediction I(i, j) and generate the final prediction I' based on the following equation:

$$I'(i,j) = I(i,j) + \Delta I(i,j) \qquad \text{Eq. 23}$$

Figure 12:
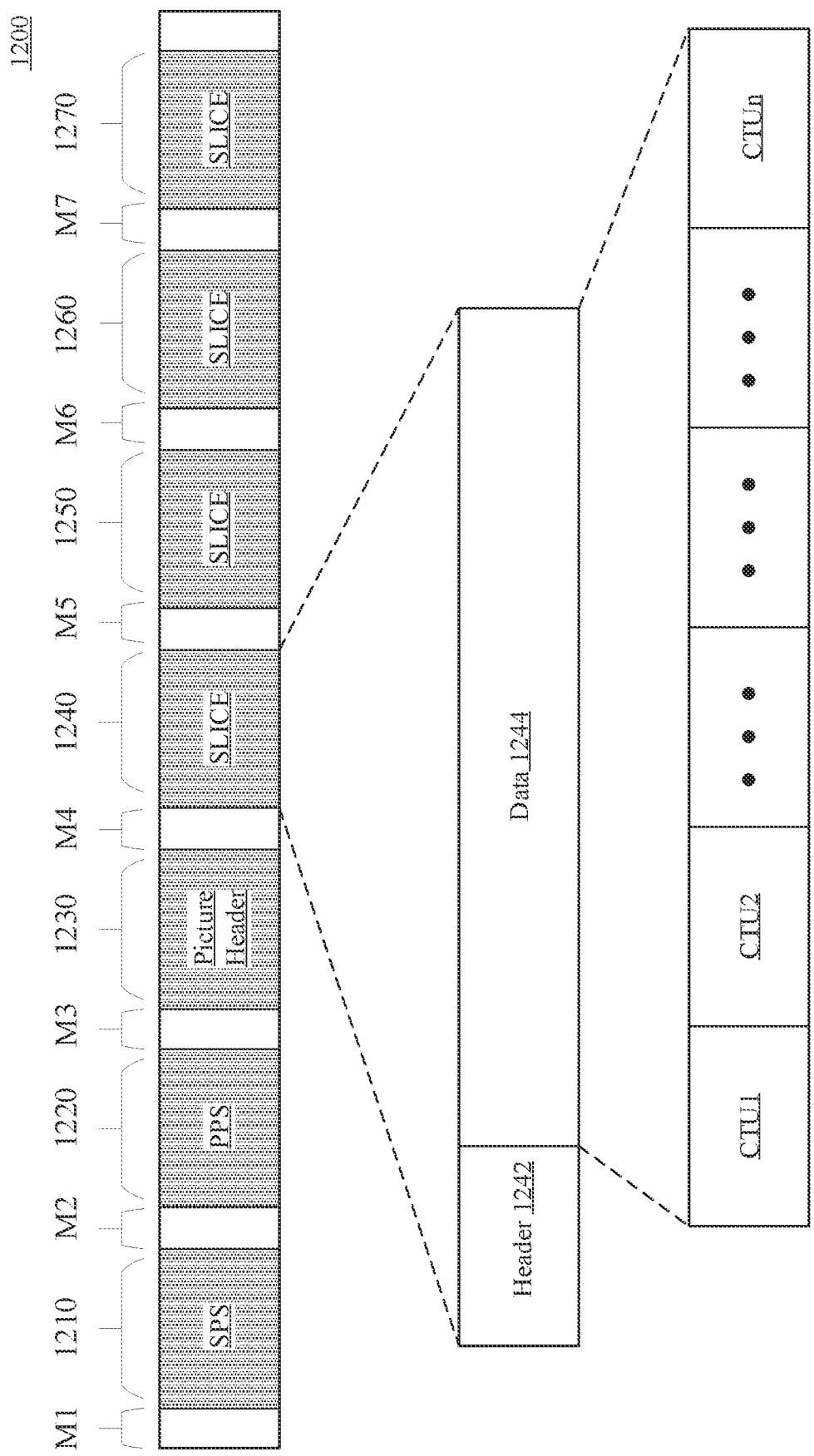
FIG. 12 illustrates an example of a bitstream encoded by the encoder, consistent with some embodiments of the present disclosure.

FIG. 12 is a schematic diagram of an example of a bitstream 1200 encoded by the encoder, consistent with some embodiments of the present disclosure. In FIG. 12, bitstream 1200 includes a Sequence Parameter Set (SPS) 1210, a Picture Parameter Set (PPS) 1220, a Picture Header 1230, Slices 1240-1270, which are separated by synchronization markers M1-M7. Slices 1240-1270 respectively include corresponding header blocks (e.g., header 1242) and data blocks (e.g., data 1244), each data block including one or more CTUs (e.g., CTU1-CTUn in data 1244).

Consistent with the disclosed embodiments, both the DMVR and the BDOF can have control flags at two levels in the syntax structure. For example, the encoder can send the first control flag in SPS 1210 on a first level (e.g., the sequence level) and send the second control flag on a second level. In some embodiments, the second level can be a picture level or a slice level. That is, the encoder can send the second control flag in picture header 1230 on the picture level, or in slice header 1242 on the slice level. An exemplary coding syntax of control flags in the SPS, with emphasis in italic, is provided in FIG. 16, consistent with some embodiments of the disclosure. An exemplary coding syntax of control flags in the slice header, with emphasis in italic, is provided in FIG. 17, consistent with some embodiments of the disclosure.

In some embodiments, the encoder sends a sequence level controlling flag for BDOF (e.g., sps_bdof_enabled_flag) and a sequence level controlling flag for DMVR (e.g., sps_dmvr_enabled_flag) in the SPS. When the sequence level controlling flag for BDOF or for DMVR is false (e.g., having a value of "0"), the corresponding BDOF or DMVR process is disabled in the video sequence that refers to the corresponding SPS. When the sequence level controlling flag for BDOF or for DMVR is true (e.g., having a value of "1"), the corresponding BDOF or DMVR process is enabled for the current video sequence. In some embodiments, the encoder further signals another picture/slice level control enabling flag (e.g., sps_dmvr_bdof_slice_present_flag) to indicate whether a picture/slice level controlling of the BDOF and DMVR process is enabled or not. For example, when the slice present flag is true, the encoder further signals a picture/slice level disabling flag (e.g., slice_disable_bdof_dmvr_flag) in the slice header to indicate whether BDOF and DMVR processes are disabled or not for the current slice.

By using two-level controlling flags, the encoder may use the picture/slice level disabling flag (e.g., slice_disable_bdof_dmvr_flag) to switch two coding tools on or off for individual slices. In some embodiments, a picture/slice level adaptation can improve the coding performance by disabling one or both of the tools, if it or they are not useful for the current slice. In addition, in some embodiments, because both tools cause relatively high computational complexity, the picture/slice level adaptation can reduce the encoding and decoding complexity of the current slice by disabling one or both of them.

In some embodiments, the encoder can also use controlling flags for the PROF process in both the sequence level and the picture/slice level.

Reference is made to FIGS. 13A-13I, which are schematic diagrams of different examples of controlling flags encoded in bitstreams 1300a-1300i, consistent with some embodiments of the present disclosure. For the ease of understanding, exemplary SPS syntax and slice header syntax corresponding to the embodiments in FIGS. 13A-13I are provided in FIG. 18A to FIG. 30. Particularly, FIG. 18A, FIG. 18B, FIG. 20, FIG. 25, and FIG. 28 each provides an exemplary coding syntax of control flags in the SPS, with emphasis in italic, consistent with some embodiments of the disclosure. FIG. 19A, FIG. 21 to FIG. 24, FIG. 26, FIG. 27, FIG. 29, and FIG. 30 each provides an exemplary coding syntax of control flags in the slice header, with emphasis in italic, consistent with some embodiments of the disclosure. It is appreciated that, in some embodiments, coding syntax of control flags in the picture header may be similar to the coding syntax of control flags in the slice header provided in FIG. 19A, FIG. 21 to FIG. 24, FIG. 26, FIG. 27, FIG. 29, and FIG. 30. For example, FIG. 19B provides an exemplary coding syntax of control flags in the picture header, with emphasis in italic, consistent with some embodiments of the disclosure.

Figure 13A:
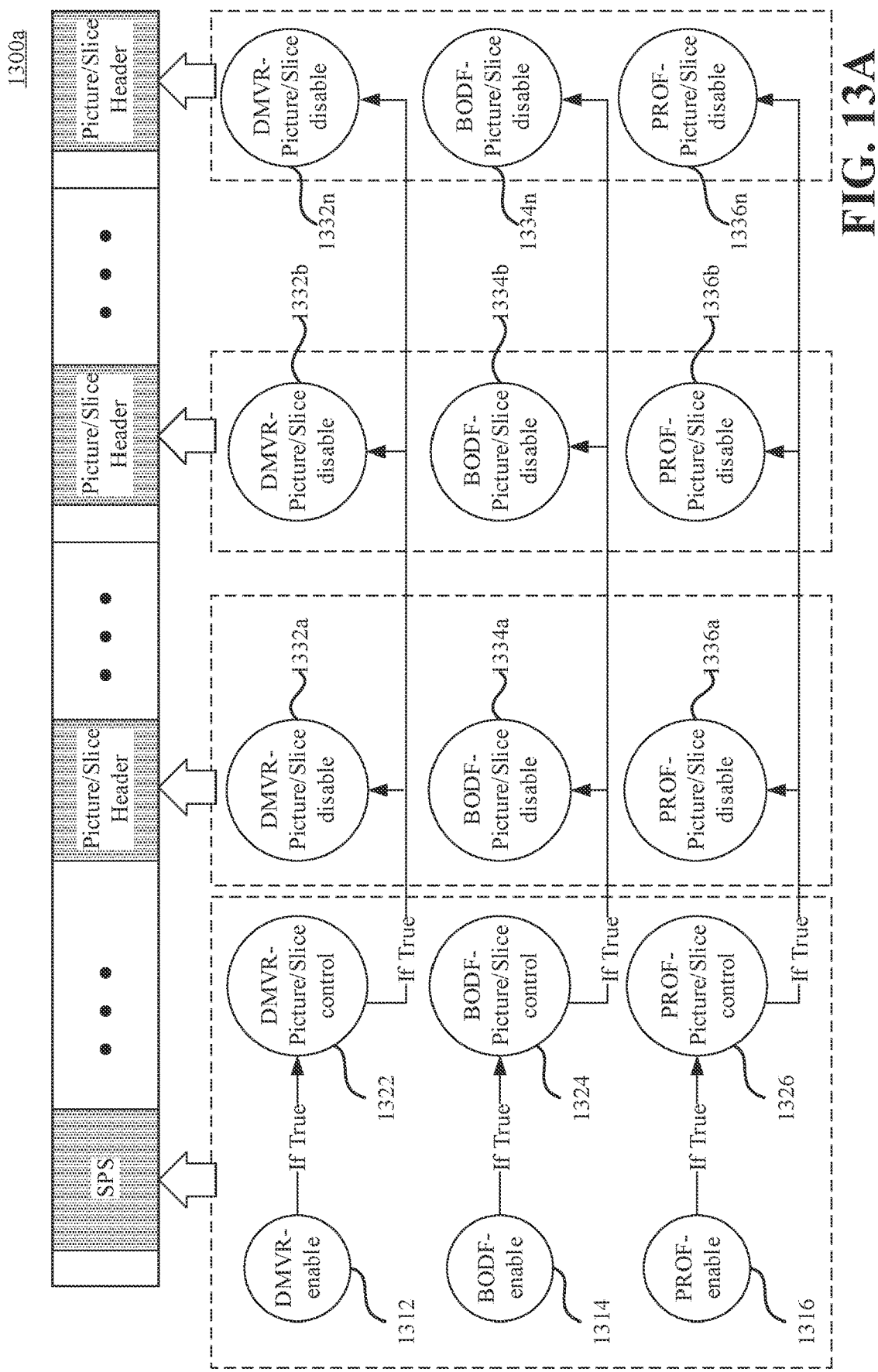
FIG. 13A illustrates an example of controlling flags encoded in bitstreams, consistent with some embodiments of the present disclosure.

The syntax illustrated in FIG. 18A, FIG. 18B and FIG. 19A, FIG. 19B corresponds to the embodiments in FIG. 13A. In FIG. 13A, the encoder can signal three separate sequence level controlling flags 1312,1314, and 1316 (e.g., sps_dmvr_enabled_flag, sps_bdof_enabled_flag, and sps_affine_prof_enabled_flag in FIG. 18A and FIG. 18B) in the SPS to respectively indicate whether DMVR, BDOF, and PROF are enabled or not. If any of them is enabled, the encoder further signals a corresponding picture/slice level control enabling flag 1322, 1324, 1326 (e.g., sps_dmvr_slice_present_flag, sps_bdof_slice_present_flag, and sps_affine_prof_slice_present_flag in FIG. 18A, or sps_dmvr_picture_present_flag, sps_bdof_picture_present_flag, and sps_affine_prof_picture_present_flag in FIG. 18B) to indicated whether the tool is controlled in the picture/slice level. If the picture/slice level controlling is enabled, then in each picture or slice header, the encoder signals a picture/slice level disabling flag 1332a-1332n, 1334a-1334n, and 1336a-1336n (e.g., slice_disable_dmvr_flag, slice_disable_bdof_flag, and slice_disable_affine_prof_flag in FIG. 19A, or ph_disable_dmvr_flag, ph_disable_bdof_flag, and ph_disable_affine_prof_flag in FIG. 19B) to indicate whether the corresponding tool is disabled or not for the target picture or slice.

In some embodiments, DMVR, BDOF, and PROF can use separate sequence level enabling flags but share the same picture/slice level control enabling flag. In some examples, the encoder can signal one picture/slice level disabling flag (e.g., slice_disable_bdof_dmvr_affine_prof_flag in FIG. 21) for the three coding tools. In some other examples, the encoder can signal three separate picture/slice level disabling flags for these three coding tools. In yet some other examples, the encoder can signal two picture/slice level disabling flags for three coding tools. These examples will be detailed in the following paragraphs.

Figure 13B:
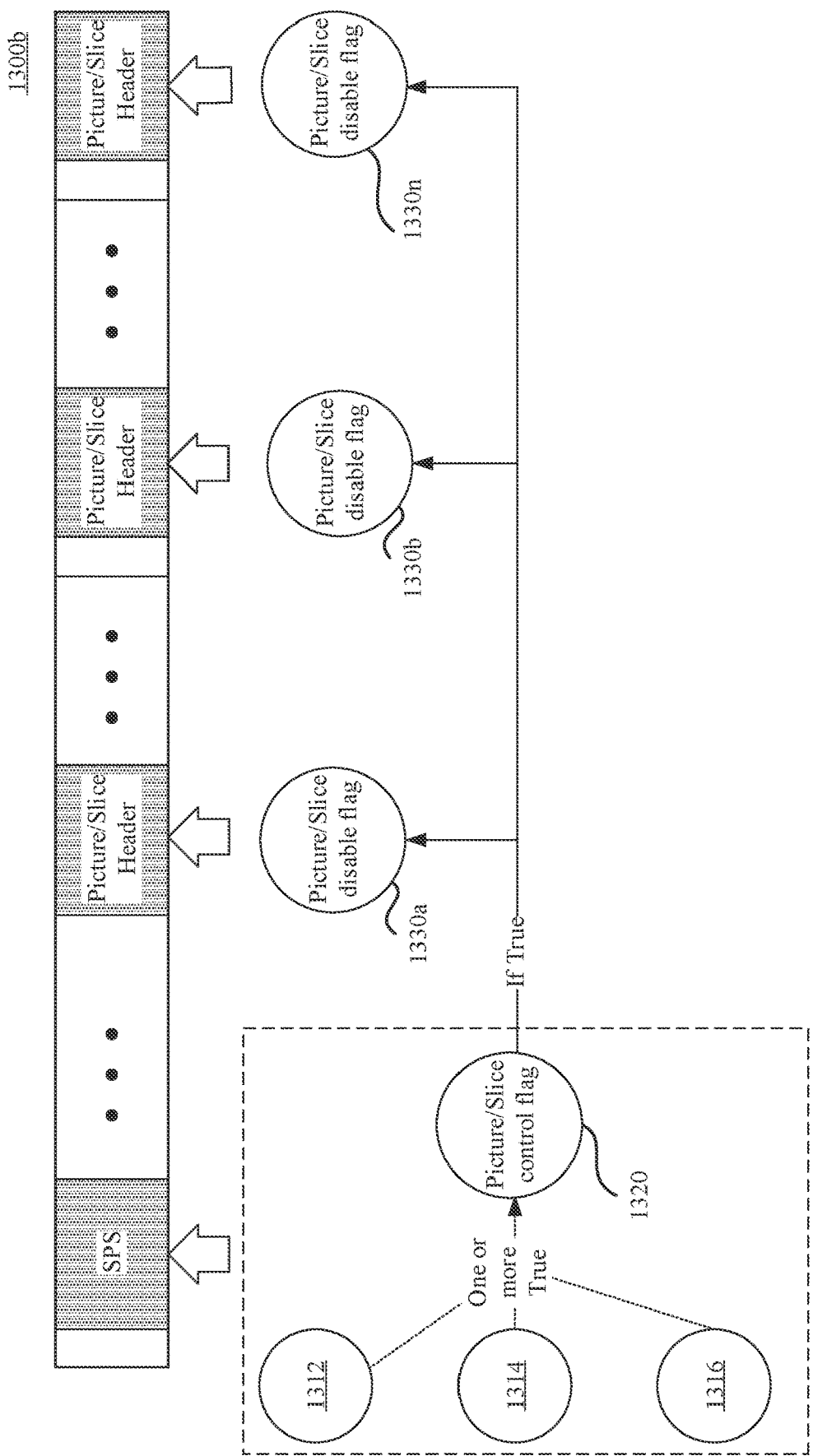
FIG. 13B illustrates another example of controlling flags encoded in bitstreams, consistent with some embodiments of the present disclosure.

Reference is made to FIG. 13B, which is a schematic diagram of an example of controlling flags encoded in bitstream 1300b, consistent with some embodiments of the present disclosure. The syntax illustrated in FIG. 20 and FIG. 21 corresponds to the embodiments in FIG. 13B. In this example, three separate flags 1312, 1314, and 1316 are signaled in the SPS to indicate respectively whether DMVR, BDOF, and PROF are enabled or not. If at least one tool is enabled, a picture/slice level control enabling flag 1320 (e.g., sps_bdof_dmvr_affine_prof_slice_present_flag in FIG. 20) is signaled to indicate whether the at least one sequence-level enabled tool is controlled in picture/slice level. If picture/slice level controlling is enabled (flag 1320 being true), in each picture or slice header, a picture/slice level disabling flag 1330a-1330n (e.g., slice_disable_bdof_dmvr_affine_prof_flag in FIG. 21) is signaled to indicate whether the at least one sequence-level enabled tool is disabled or not for the current slice. In this example, if two or more coding tools of DMVR, BDOF, and PROF are enabled in the sequence level, these tools are jointly controlled in the picture/slice level, if the picture/slice level controlling is enabled.

Figure 13C:
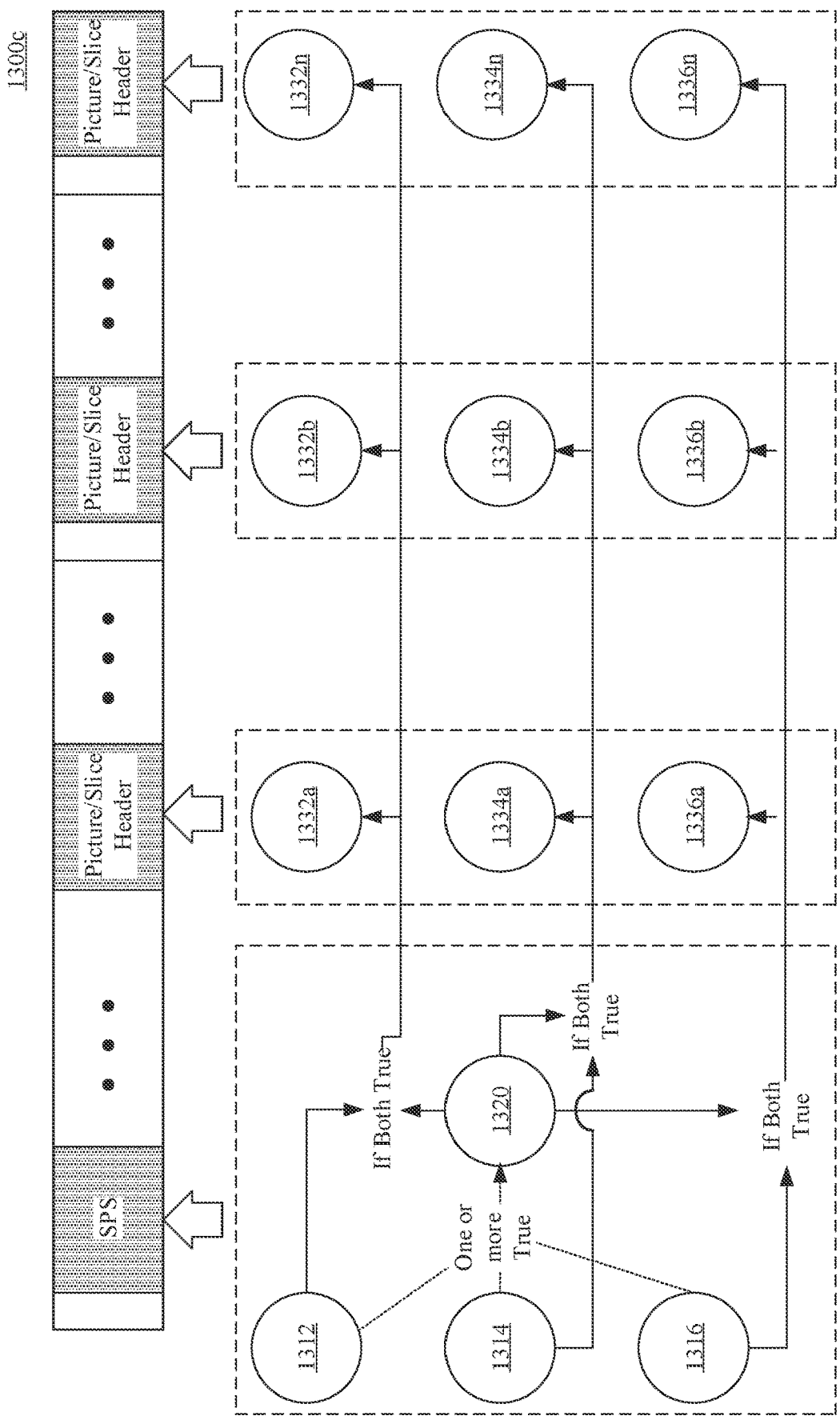
FIG. 13C illustrates another example of controlling flags encoded in bitstreams, consistent with some embodiments of the present disclosure.

Reference is made to FIG. 13C, which is a schematic diagram of an example of controlling flags encoded in bitstream 1300c, consistent with some embodiments of the present disclosure. The syntax illustrated in FIG. 20 and FIG. 22 corresponds to the embodiments in FIG. 13C. In this example, similar to the example in FIG. 13B, three separate flags 1312, 1314, and 1316 are signaled in the SPS to indicate whether DMVR, BDOF, and PROF are enabled or not. If at least one tool is enabled, picture/slice level control enabling flag 1320 (e.g., sps_bdof_dmvr_affine_prof_slice_present_flag in FIG. 20) is signaled to indicate whether to control the coding tools in picture/slice level. Compared to the example in FIG. 13B, in FIG. 13C, if the picture/slice level controlling is enabled (sps_bdof_dmvr_affine_prof_slice_present_flag being true), for each sequence-level enabled tool, picture/slice level disabling flag 1332a-1332n, 1334a-1334n, and 1336a-1336n can be signaled to indicate whether the tool is disabled for the current slice. For example, if BDOF is enabled at the sequence-level (sps_bdof_enabled_flag being true) and the picture/slice level controlling is enabled (sps_bdof_dmvr_affine_prof_slice_present_flag being true), the encoder signals the picture/slice level disabling flag for BDOF (e.g., slice_disable_bdof_flag in FIG. 22) to indicate whether BDOF is disabled for the current slice. Similarly, if DMVR is enabled at the sequence-level (sps_dmvr_enabled_flag being true) and the picture/slice level controlling is enabled (sps_bdof_dmvr_affine_prof_slice_present_flag being true), the encoder signals the picture/slice level disabling flag for DMVR (e.g., slice_disable_dmvr_flag in FIG. 22) to indicate whether DMVR is disabled for the current slice. Also, if PROF is enabled at the sequence-level (sps_affine_prof_enabled_flag being true) and the picture/slice level controlling is enabled (sps_bdof_dmvr_affine_prof_slice_present_flag being true), the encoder signals the picture/slice level disabling flag for PROF (e.g., slice_disable_affine_prof_flag in FIG. 22) to indicate whether PROF is disabled for the current slice. Accordingly, in this example, coding tools can be separately controlled in the picture/slice level when the picture/slice level controlling is enabled.

Figure 13D:
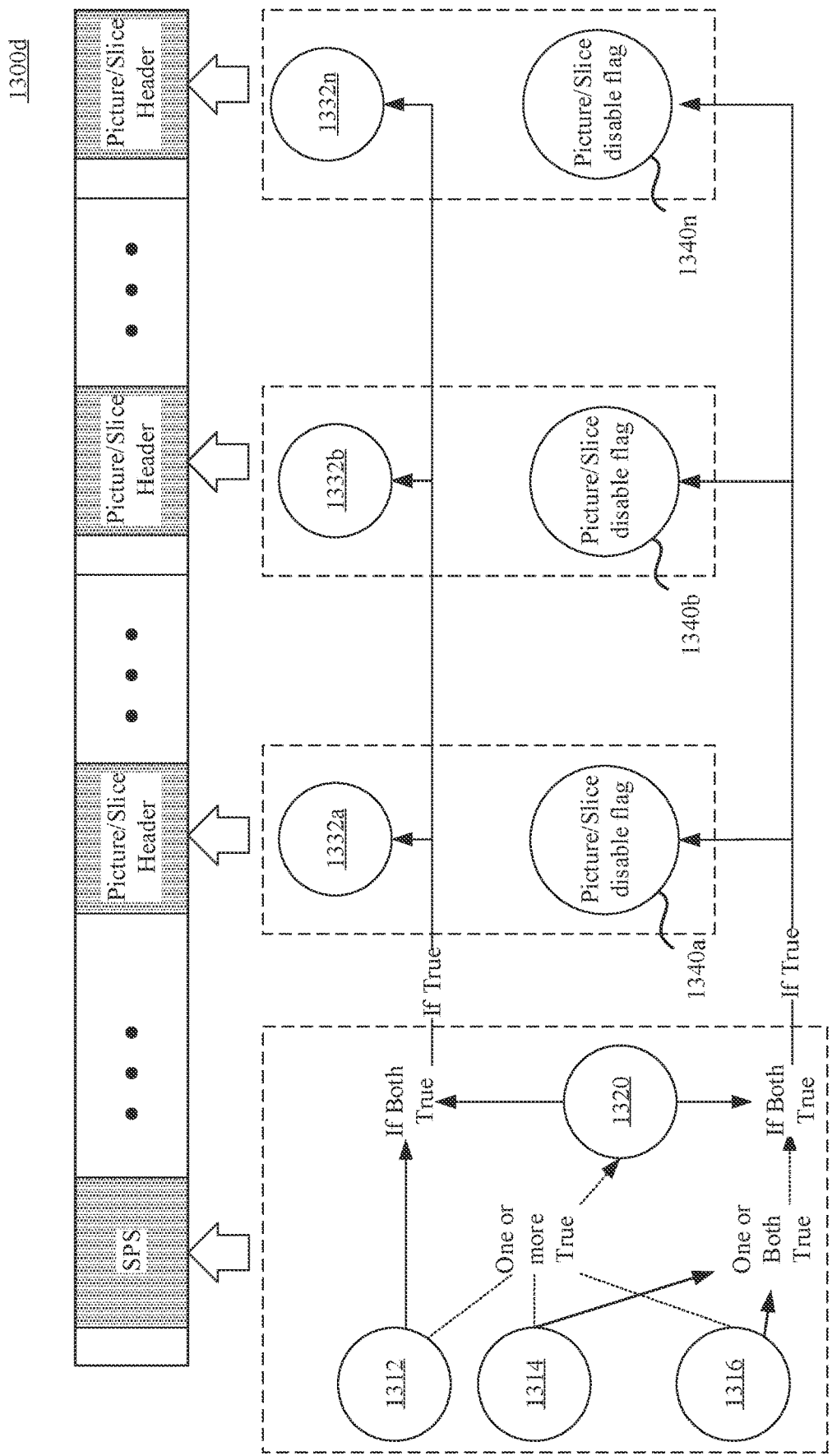
FIG. 13D illustrates another example of controlling flags encoded in bitstreams, consistent with some embodiments of the present disclosure.

Reference is made to FIG. 13D, which is a schematic diagram of an example of controlling flags encoded in bitstream 1300d, consistent with some embodiments of the present disclosure. The syntax illustrated in FIG. 20 and FIG. 23 corresponds to the embodiments in FIG. 13D. In some examples, similar to examples in FIG. 13B and FIG. 13C, three separate flags 1312, 1314, and 1316 are signaled in the SPS to indicate whether DMVR, BDOF, and PROF are enabled or not. If at least one tool is enabled, a picture/slice level control enabling flag 1320 (e.g., sps_bdof_dmvr_affine_prof_slice_present_flag) is signaled to indicate whether to control the coding tools in picture/slice level. Compared to examples in FIG. 13B and FIG. 13C, if the picture/slice level controlling is enabled (sps_bdof_dmvr_affine_prof_slice_present_flag being true), two picture/slice level disabling flags can be signaled to indicate whether the tools are disabled for the current slice.

For example, in the embodiments shown in FIG. 13D, if BDOF or PROF is enabled at the sequence-level (at least one of flags 1314 or 1316 being true), and the picture/slice level controlling is enabled (flag 1320 being true), the encoder signals the same picture/slice level disabling flag 1340a-1340n for BDOF and PROF (e.g., slice_disable_bdof_affine_prof_flag in FIG. 23) to indicate whether the sequence-level enabled one (or both) of BDOF and PROF is (are) disabled for the current slice. If DMVR is enabled at the sequence-level (flag 1312 being true) and the picture/slice level controlling is enabled (flag 1320 being true), the encoder signals the picture/slice level disabling flag 1332a-1332n for DMVR (e.g., slice_disable_dmvr_flag in FIG. 23) to indicate whether DMVR is disabled for the current slice. In this example, BDOF and PROF are jointly controlled in the picture/slice level and DMVR is separately controlled, if the picture/slice level controlling is enabled.

Figure 13E:
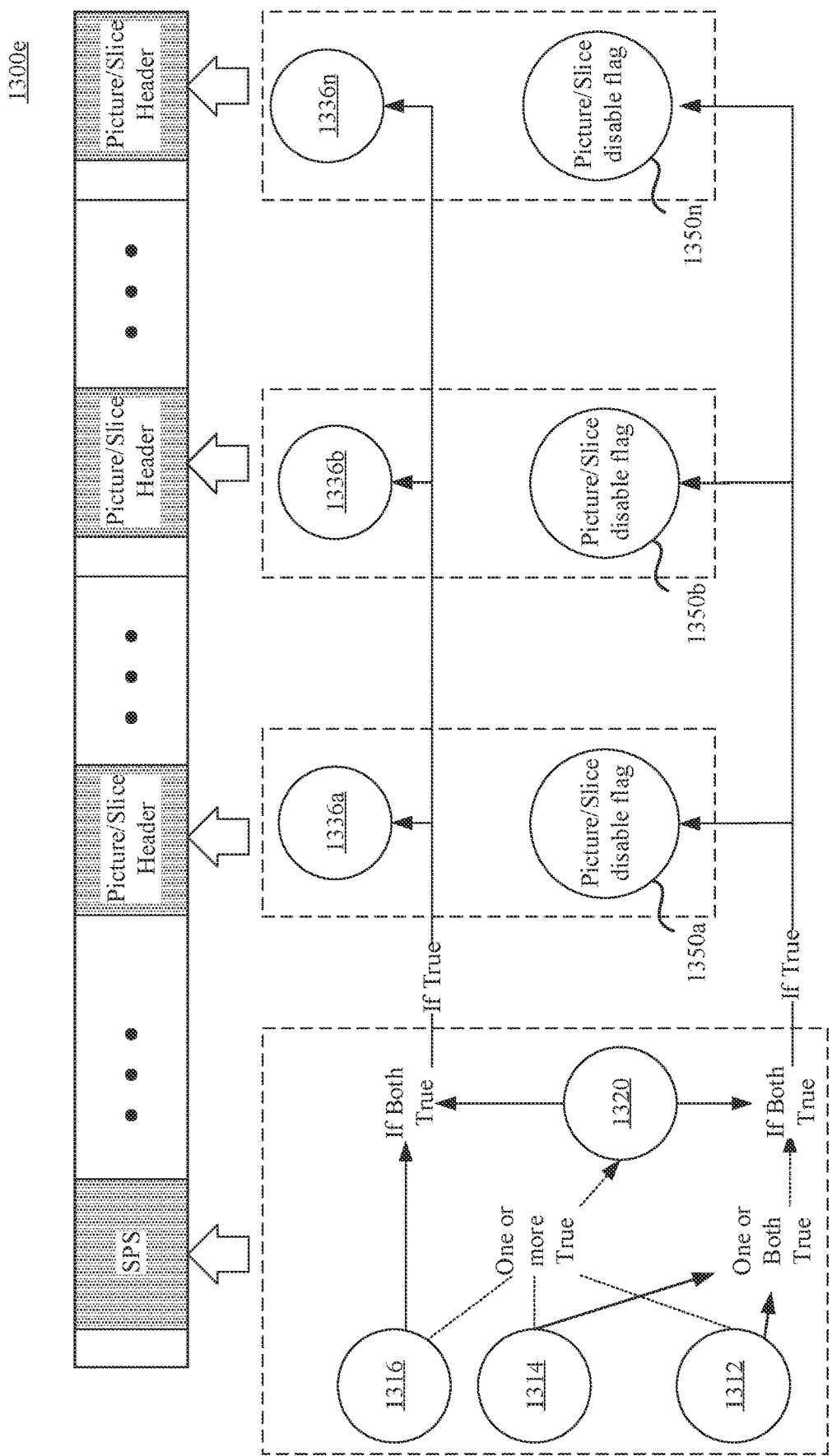
FIG. 13E illustrates another example of controlling flags encoded in bitstreams, consistent with some embodiments of the present disclosure.

For another example, in the embodiments shown in FIG. 13E, the encoder signals the sequence level controlling flags 1312, 1314, and 1316 and the picture/slice level control enabling flag 1320 in similar ways as in the embodiments shown in FIGS. 13B-13D. Similar to the example in FIG. 13D, in FIG. 13E, if the picture/slice level controlling is enabled (e.g., flag 1320 being true), two picture/slice level disabling flags can be signaled to indicate whether the tools are disabled for the current slice. The syntax illustrated in FIG. 20 and FIG. 24 corresponds to the embodiments in FIG. 13E. In the embodiments shown in FIG. 13E, if BDOF or DMVR is enabled at the sequence-level (at least one of flags 1312 or 1314 being true), and the picture/slice level controlling is enabled (e.g., flag 1320 being true), the encoder signals the same picture/slice level disabling flag 1350a-1350n for BDOF and DMVR (e.g., slice_disable_bdof_dmvr_flag in FIG. 24) to indicate whether the sequence-level enabled one (or both) of BDOF and DMVR is disabled for the current slice. If PROF is enabled at the sequence-level (e.g., flag 1316 being true) and the picture/slice level controlling is enabled (flag 1320 being true), the encoder signals the picture/slice level disabling flag 1336a-1336n for PROF (e.g., slice_disable_affine_prof_flag in FIG. 24) to indicate whether PROF is disabled for the current slice. In this example, BDOF and DMVR are jointly controlled in the picture/slice level and PROF is separately controlled, if the picture/slice level controlling is enabled.

Figure 13F:
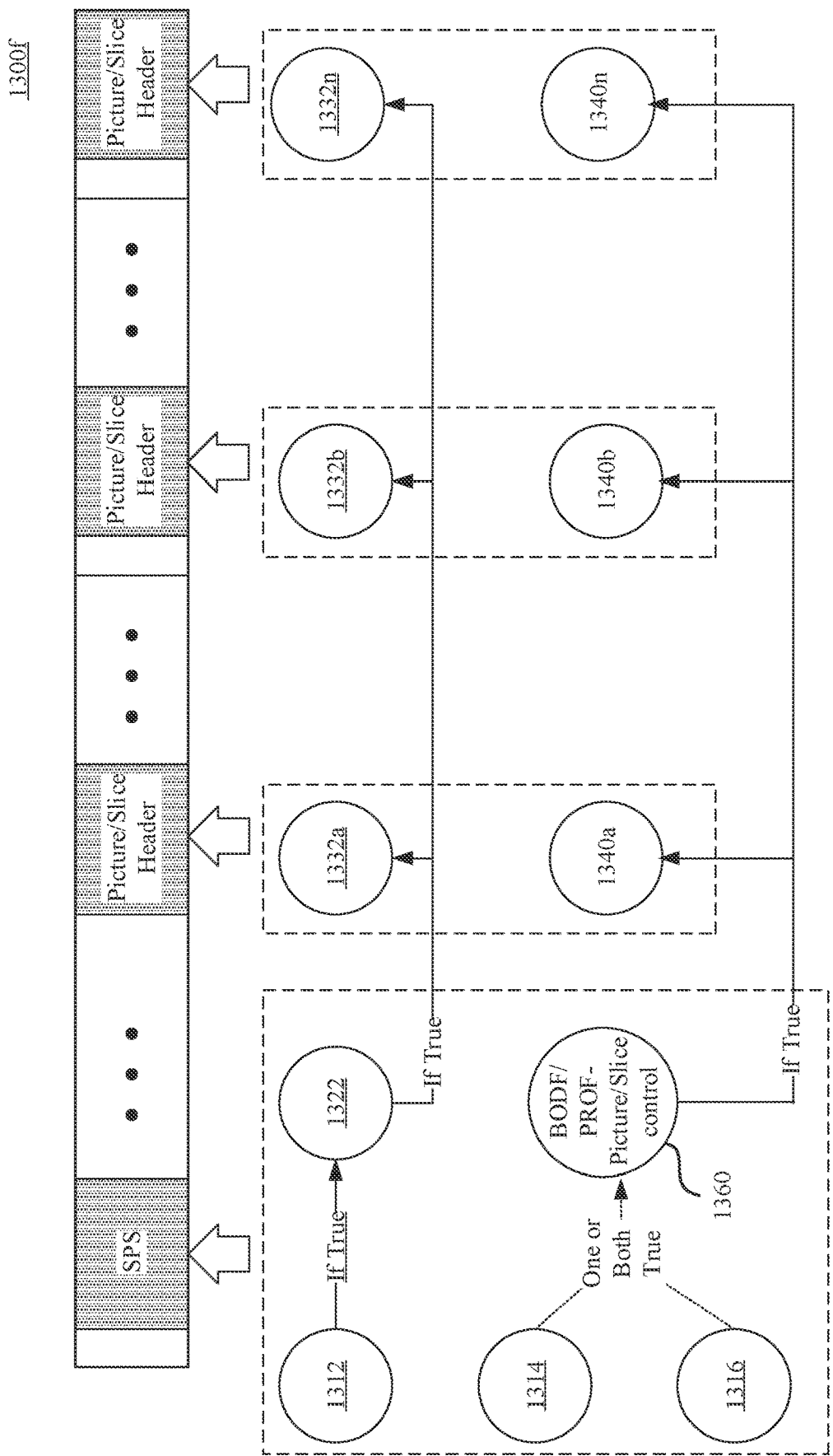
FIG. 13F illustrates another example of controlling flags encoded in bitstreams, consistent with some embodiments of the present disclosure.

The syntax illustrated in FIG. 25 and FIG. 26 corresponds to the embodiments in FIG. 13F. Considering that BDOF and PROF both use optical flow to refine the inter-prediction, in some embodiments, BDOF and PROF can share one picture/slice level control enabling flag (e.g., sps_bdof_affine_prof_slice_present_flag in FIG. 25) while DMVR uses a separate picture/slice level control enabling flag (e.g., sps_dmvr_slice_present_flag in FIG. 25). In some examples, BDOF and PROF can further share one picture/slice level disabling flag (e.g., slice_disable_bdof_affine_prof_flag in FIG. 26) and DMVR uses another picture/slice level disabling flag (e.g., slice_disable_dmvr_flag in FIG. 26). In some other examples, the encoder signals three separate picture/slice level disabling flags for these three coding tools, respectively.

In the embodiments shown in FIG. 13F, the encoder signals the sequence level controlling flags 1312, 1314, and 1316 in similar ways as in FIGS. 13A-13E. If DMVR is enabled at the sequence-level (flag 1312 being true), the encoder signals the picture/slice level control enabling flag 1322 for DMVR (e.g., sps_dmvr_slice_present_flag in FIG. 25) to indicate whether DMVR is controlled in the picture/slice level. If BDOF or PROF is enabled at the sequence-level (flag 1314 and/or flag 1316 being true), the encoder signals one picture/slice level control enabling flag 1360 for BDOF and PROF (e.g., sps_bdof_affine_prof_slice_present_flag in FIG. 25) to indicate whether the BDOF and/or PROF are/is controlled in the picture/slice level. In the picture header or the slice header, if the picture/slice level controlling is enabled for DMVR (flag 1322 being true), the encoder signals a picture/slice level disabling flag (e.g., flag 1332a-1332n) for DMVR to indicated whether DMVR is disabled for the current picture/slice. If the picture/slice level controlling is enabled for BDOF and PROF (flag 1360 being true), the encoder signals one slice disabling flag (e.g., flag 1340a-1340n) to indicate whether the sequence-level enabled one (or both) of BDOF and PROF is (are) disabled for the current picture/slice.

In this example, BDOF and PROF are jointly controlled in the picture/slice level by the same picture/slice level disabling flag and DMVR is separately controlled in the picture/slice level by another picture/slice level disabling flag, if picture/slice level controlling is enabled.

Figure 13G:
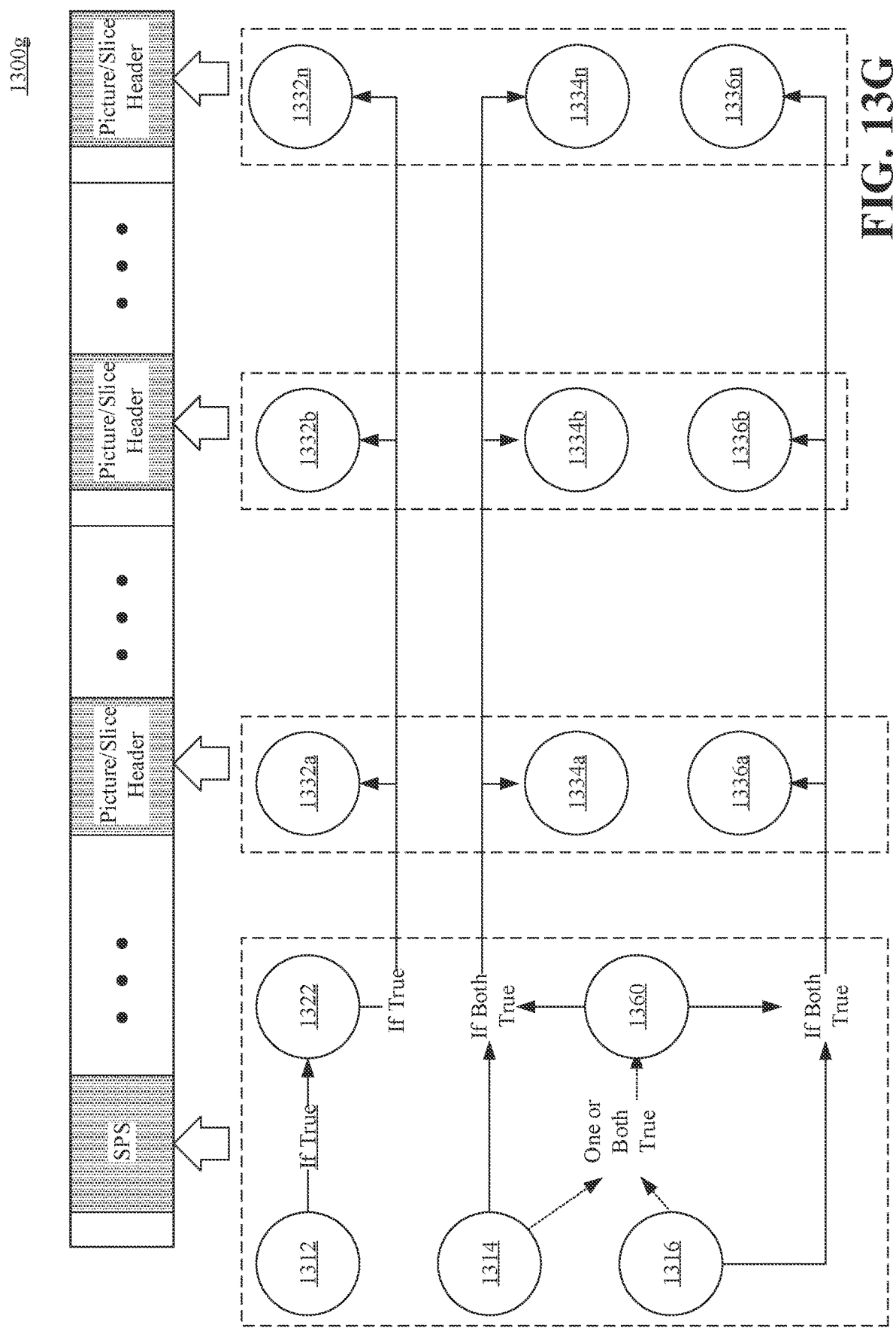
FIG. 13G illustrates another example of controlling flags encoded in bitstreams, consistent with some embodiments of the present disclosure.

The syntax illustrated in FIG. 25 and FIG. 27 corresponds to the embodiments in FIG. 13G. In the embodiments shown in FIG. 13G, the encoder signals the sequence level controlling flags (e.g., flags 1312, 1314, and 1316) in similar ways as in FIGS. 13A-13G. In addition, the encoder signals two picture/slice level control enabling flags, one for DMVR, and the other one for both BDOF and PROF in similar ways as in FIG. 13F.

In the embodiments in FIG. 13G, in the picture header or the slice header, if the picture/slice level controlling is enabled for DMVR (e.g., flag 1322 being true), the encoder signals a picture/slice level disabling flag for DMVR (e.g., flag 1332a-1332b) to indicate whether DMVR is disabled for the current picture/slice. If BDOF is enabled at the sequence-level (flag 1314 being true) and the picture/slice level controlling is enabled for BDOF and PROF (flag 1360 being true), the encoder signals a picture/slice level disabling flag for BDOF (e.g., flag 1334a-1334n) to indicate whether BDOF is disabled for the current picture/slice. If PROF is enabled at the sequence-level (flag 1316 being true) and the picture/slice level controlling is enabled for BDOF and PROF (flag 1360 being true), the encoder signals a picture/slice level disabling flag for PROF (e.g., flag 1336a-1336n) to indicate whether PROF is disabled for the current slice. That is, in this example, coding tools are separately controlled by separate picture/slice level disabling flags 1332a-1332n, 1334a-1334n, 1336a-1336n in the picture/slice level if the picture/slice level controlling is enabled.

Figure 13H:
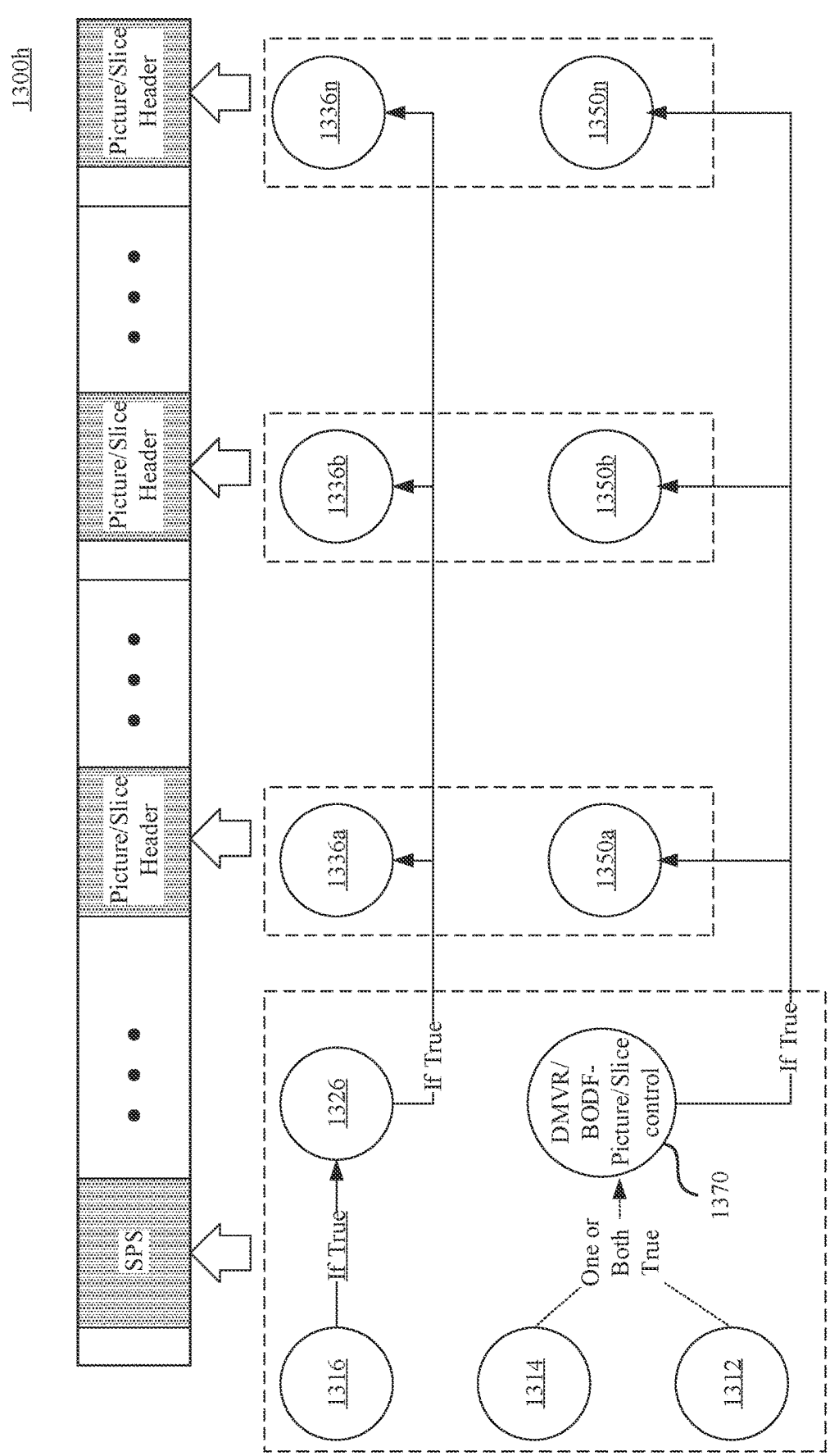
FIG. 13H illustrates another example of controlling flags encoded in bitstreams, consistent with some embodiments of the present disclosure.

The syntax illustrated in FIG. 28 and FIG. 29 corresponds to the embodiments in FIG. 13H. In terms of implementation cost, compared to PROF, BDOF and DMVR are relatively expensive. To save the implementation cost, in some embodiments, the controlling of PROF at the picture/slice level can be separate from the controlling of BDOF and/or DMVR at the picture/slice level. That is, BDOF and DMVR can share the same picture/slice level control enabling flag (e.g., sps_dmvr_bdof_slice_present_flag in FIG. 28) and PROF can have a separate picture/slice level control enabling flag (e.g., sps_affine_prof_slice_present_flag in FIG. 28), but the present disclosure is not limited thereto.

In the embodiments shown in FIG. 13H, the encoder signals the sequence level controlling flags (e.g., flags 1312, 1314, and 1316) in similar ways as in FIGS. 13A-13G. In this example, the encoder signals two picture/slice level control enabling flags, one for PROF, and the other one for both BDOF and DMVR. If BDOF or DMVR is enabled at the sequence-level (flag 1312 and/or flag 1314 being true), the encoder signals one picture/slice level control enabling flag 1370 for BDOF or DMVR (e.g., sps_dmvr_bdof_slice_present_flag) to indicate whether BDOF and/or DMVR are/is controlled at the picture/slice level. If PROF is enabled at the sequence-level (flag 1316 being true), the encoder signals the picture/slice level control enabling flag for PROF (e.g., flag 1326) to indicate whether PROF is controlled at the picture/slice level.

In the picture header or the slice header, if the picture/slice level controlling is enabled for PROF (flag 1326 being true), the encoder signals a picture/slice level disabling flag (e.g., flag 1336a-1336n) to indicate whether PROF is disabled for the current picture/slice. If the picture/slice level controlling is enabled for BDOF and DMVR (flag 1370 being true), the encoder signals one slice disabling flag (e.g., flag 1350a-1350n) to indicate whether the sequence-level enabled one (or both) BDOF and/or DMVR are/is disabled for the current picture/slice.

In the embodiments shown in FIG. 13H, DMVR and BDOF are jointly controlled at the picture/slice level by the same picture/slice level disabling flag, and PROF is separately controlled at the picture/slice level by another picture/slice level disabling flag if the picture/slice level controlling is enabled.

Figure 13I:
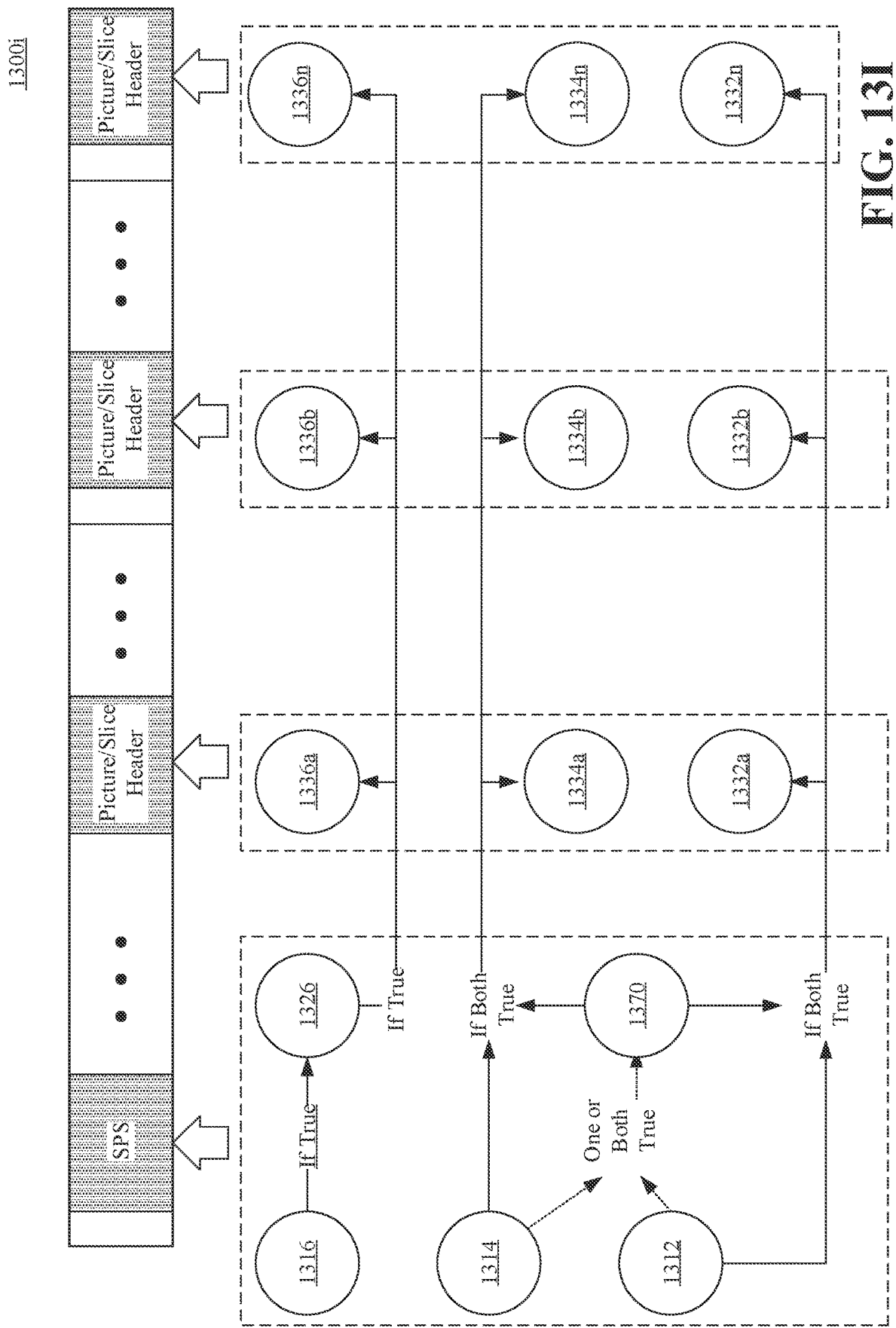
FIG. 13I illustrates another example of controlling flags encoded in bitstreams, consistent with some embodiments of the present disclosure.

Reference is made to FIG. 13I. The syntax illustrated in FIG. 28 and FIG. 30 corresponds to the embodiments in FIG. 13I. In the embodiments shown in FIG. 13I, the encoder signals three separate sequence level controlling flags (e.g., flags 1312, 1314, and 1316) in similar ways as in the examples shown in FIGS. 13A-13H. Similar to the example in FIG. 13H, the encoder signals two picture/slice level control enabling flags, one for PROF (e.g., flag 1326), and the other one for both BDOF and DMVR (e.g., flag 1370). If BDOF or DMVR is enabled at the sequence-level (flag 1312 and/or flag 1314 being true), the encoder signals one picture/slice level control enabling flag 1370) to indicate whether BDOF and/or DMVR are/is controlled at the picture/slice level. If PROF is enabled at the sequence-level (flag 1316 being true), the encoder signals the picture/slice level control enabling flag 1326 for PROF to indicate whether PROF is controlled at the picture/slice level.

In the picture header or the slice header, if BDOF is enabled at the sequence-level (flag 1314 being true) and the picture/slice level controlling is enabled for BDOF and DMVR (flag 1370 being true), the encoder signals a picture/slice disabling flag for BDOF (e.g., flags 1334a-1334n) to indicate whether BDOF is disabled for the current picture/slice. If DMVR is enabled at the sequence-level (flag 1312 being true) and the picture/slice level controlling is enabled for BDOF and DMVR (flag 1370 being true), the encoder signals a picture/slice disabling flag for DMVR (e.g., flags 1332a-1332n) to indicate whether DMVR is disabled for the current picture/slice. If the picture/slice level controlling is enabled for PROF (flag 1326 being true), the encoder signals a picture/slice disabling flag for PROF (e.g., flags 1336a-1336n) to indicate whether PROF is disabled for the current picture/slice. That is, similar to the embodiments shown in FIG. 13G, DMVR, BDOF and PROF are separately controlled in this example by separate picture/slice level disabling flags in the picture/slice level, if the picture/slice level controlling is enabled.

Accordingly, when any of encoded bitstreams 1300a-1300i shown in FIGS. 13A-13I is transmitted to decoder 300, decoder 300 can perform the decoding process according to sequence level controlling flags for coding tools and one or more picture/slice level control enabling flags coded in the SPS, and according to one or more picture/slice disabling flags coded in the picture header or the slice header, if the picture/slice level control is enabled for one or more of the coding tools. Based on these flags, decoder 300 can determine which coding tool(s) is/are enabled at the sequence-level, whether the picture/slice level control is enabled for the sequence-level enabled coding tool(s), and whether the coding tool(s) is/are disable or enable in the current picture/slice. In addition, while BDOF, DMVR, PROF are described in the embodiments above for the ease of understanding, the present disclosure is not limited to these three coding tools.

In various embodiments, two-level controlling flags may also be applied for other coding tools. Similarly, any two or more coding tools can be jointly controlled by a single picture/slice disabling flag, or jointly controlled by a single picture/slice level control enabling flag in the SPS. Furthermore, in some embodiments, coding tools may be controlled at the sequence-level, the picture-level, and the slice-level. That is, a three-level control may be enabled, and the encoded bitstreams may include both picture disabling flag(s) in the picture header, and slice disabling flag(s) in the slice header, to respectively indicate whether corresponding coding tool(s) are disabled for the current picture, and whether corresponding coding tool(s) are disabled for the current slice, if enabled for the current picture.

Figure 14:
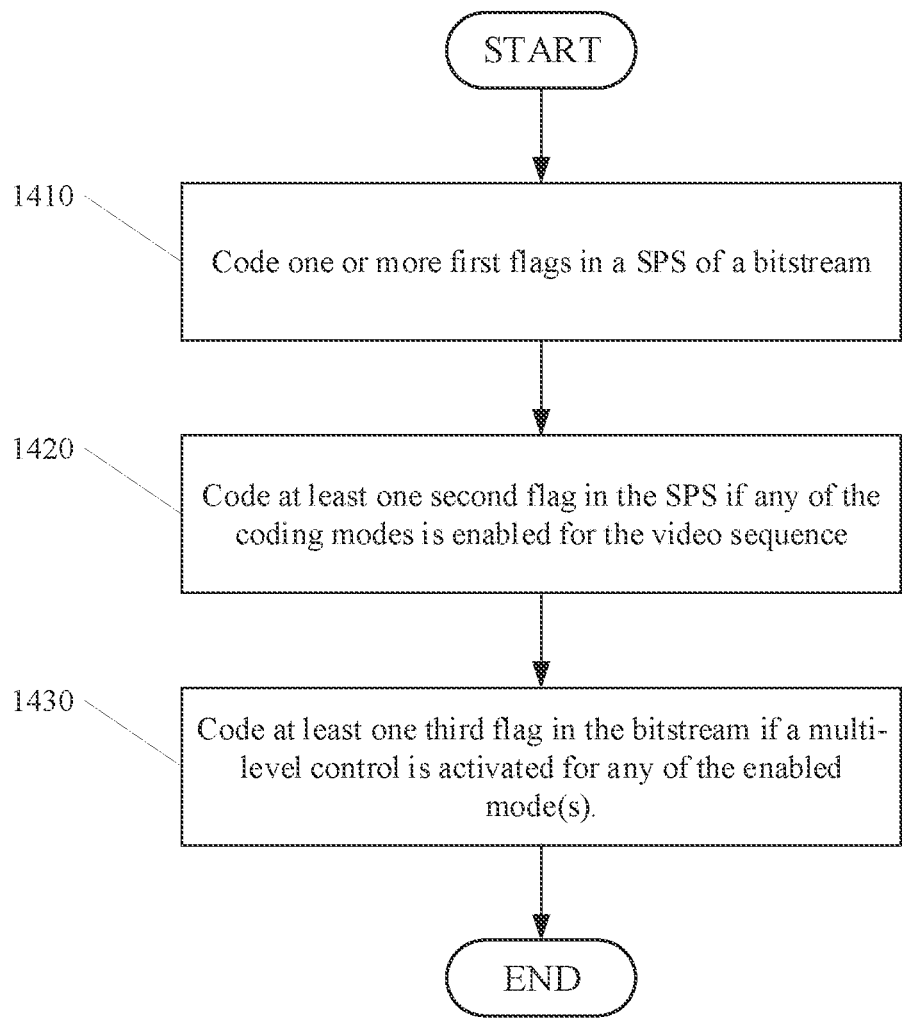
FIG. 14 illustrates a flowchart of an exemplary process for a video encoding method, consistent with some embodiments of the disclosure.

FIG. 14 illustrates a flowchart of an exemplary video encoding method 1400, consistent with some embodiments of the disclosure. In some embodiments, video encoding method 1400 can be performed by an encoder (e.g., encoder 200 in FIG. 2) to generate bitstream 1300a-1300i shown in FIGS. 13A-13I. For example, the encoder can be implemented as one or more software or hardware components of an apparatus (e.g., apparatus 400 in FIG. 4) for encoding or transcoding a video sequence (e.g., video sequence 202 in FIG. 2) to generate the bitstream (e.g., video bitstream 228 in FIG. 2) for the video sequence. For example, a processor (e.g., processor 402 in FIG. 4) can perform video encoding method 1400.

Referring to video encoding method 1400, at step 1410, the encoder codes one or more first flags (e.g., flags 1312, 1314, and 1316 in FIGS. 13A-13I) in the SPS of a bitstream (e.g., any of bitstreams 1300a-1300i shown in FIGS. 13A-13I). First flags 1312, 1314, and 1316 respectively indicate whether one or more coding modes are enabled for the video sequence associated with the bitstream. In some embodiments, the one or more coding modes include the DMVR mode, the BDOF mode, the PROF mode, or any combination thereof.

At step 1420, the encoder codes at least one second flag (e.g., flags 1320, 1322, 1324, 1326, 1360, and/or 1370 in FIGS. 13A-13I) in the SPS if any of the coding modes is enabled for the video sequence. Second flags 1320, 1322, 1324, 1326, 1360, and/or 1370 can indicate whether a multi-level control is activated for one or more enabled modes.

For example, in some embodiments (e.g., embodiments in FIG. 13A), the encoder can code one or more flags 1322, 1324, 1326, as the second flags, respectively corresponding to the DMVR mode, the BDOF mode, and the PROF mode, if the coding mode belongs to one or more enabled modes that is enabled for the video sequence. In some embodiments, (e.g., embodiments in FIGS. 13B-13E), the encoder can code a single flag 1320, as the second flag, corresponding to the enabled mode(s). In some embodiments, (e.g., embodiments in FIGS. 13F-13I), the encoder can code one or more second flags, and at least one of the second flag(s) corresponds to two or more coding modes. For example, flag 1360 in FIG. 13F and FIG. 13G corresponds to both the BODF mode and the PROF mode. For another example, flag 1370 in FIG. 13H and FIG. 13I corresponds to both the BODF mode and the DMVR mode.

At step 1430, the encoder codes at least one third flag (e.g., flags 1330a-1330n, 1332a-1332n, 1334a-1334n, 1336a-1336n, 1340a-1340n, 1350a-1350n, in FIGS. 13A-13I) in the bitstream if the multi-level control is activated for any of the enabled mode(s). Third flags 1330a-1330n, 1332a-1332n, 1334a-1334n, 1336a-1336n, 1340a-1340n, 1350a-1350n can indicate whether one or more multi-level controlled modes are disabled in a target picture or a target slice. For example, when coding the third flag(s), the encoder can code the corresponding third flag in a picture header associated with the target picture, or code the corresponding third flag in a slice header associated with the target slice.

In addition, in some embodiments, when coding the third flag(s), the encoder can code one or more flags 1332a-1332n, 1334a-1334n, and 1336a-1336n, respectively corresponding to the one or more multi-level controlled modes, as shown in FIG. 13A, FIG. 13C, FIG. 13G and FIG. 13I. In some embodiments, when coding the third flag(s), the encoder can code a single flag 1330a-1330n corresponding to the multi-level controlled mode(s), as shown in FIG. 13B. In some embodiments, when coding the third flag(s), the encoder can code one or more flags, and at least one of the third flag(s) corresponds to two or more coding modes. For example, flags 1340a-1340n in FIG. 13D and FIG. 13F each correspond to both the BODF mode and the PROF mode. For another example, flags 1350a-1350n in FIG. 13E and FIG. 13H each correspond to both the BODF mode and the DMVR mode.

Figure 15:
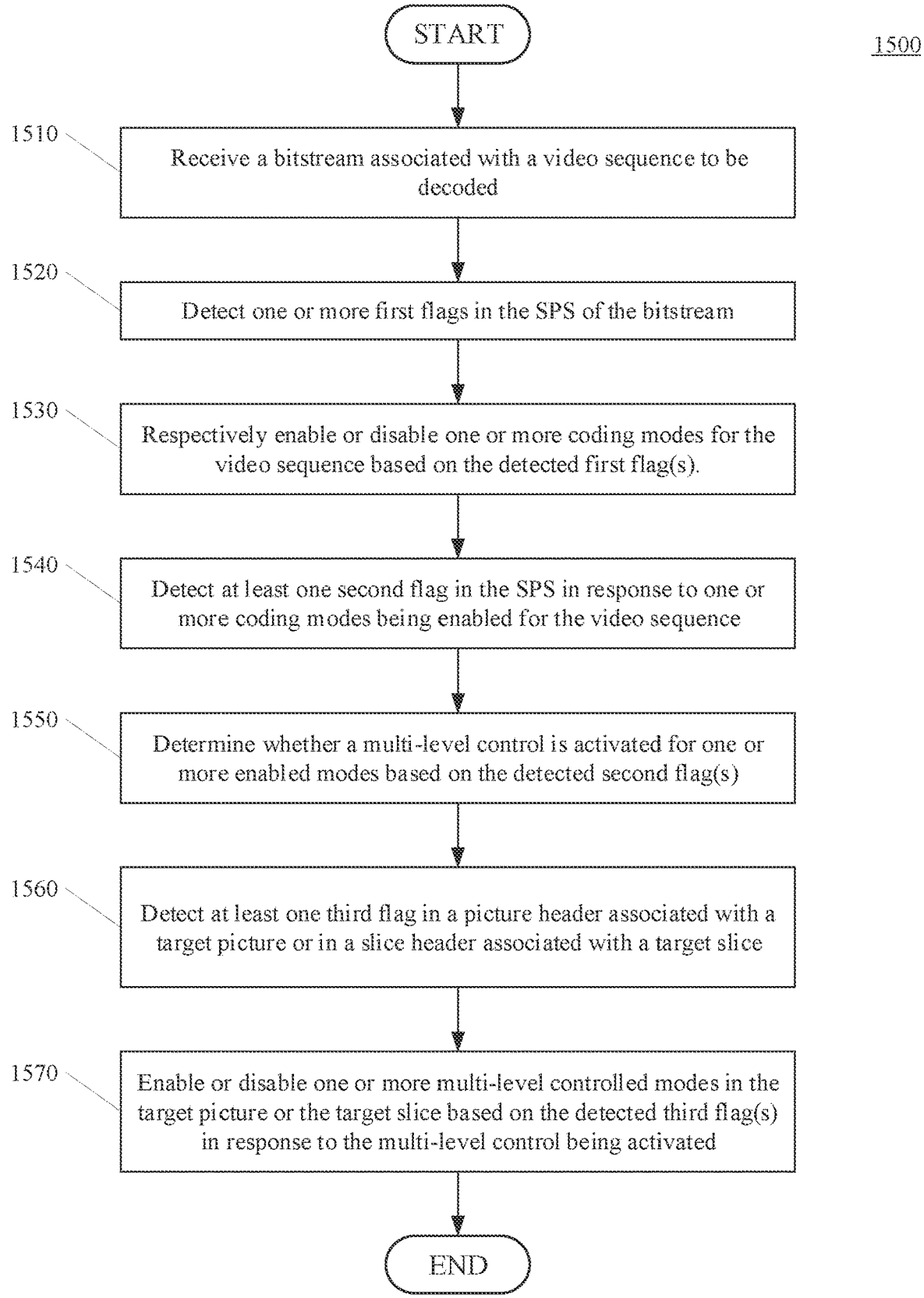
FIG. 15 illustrates a flowchart of an exemplary process for a video decoding method, consistent with some embodiments of the disclosure.

As explained above, bitstreams 1300*a*-1300*i* generated by encoder 200 using video encoding methods 1400 can be decoded by decoder 300 by an inverse operation. FIG. 15 is an exemplary video decoding method 1500 corresponding to video encoding method 1400 in FIG. 14, consistent with some embodiments of the disclosure. In some embodiments, video decoding method 1500 can be performed by a decoder (e.g., decoder 300 in FIG. 3) to respectively decode bitstreams 1300*a*-1300*i* in FIGS. 13A-13I. For example, the decoder can be implemented as one or more software or hardware components of an apparatus (e.g., apparatus 400 in FIG. 4) for decoding the bitstream (e.g., video bitstream 228 in FIG. 3) to reconstruct a video sequence (e.g., video stream 304 in FIG. 3) of the bitstream. For example, a processor (e.g., processor 402 in FIG. 4) can perform video decoding method 1500.

Referring to video decoding method 1500, at step 1510, the decoder receives a bitstream (e.g., video bitstream 228 in FIG. 3) associated with a video sequence to be decoded. At step 1520, the decoder detects one or more first flags (e.g., first flags 1312, 1314, and 1316 in FIGS. 13A-13I) in the SPS of the bitstream. At step 1530, the decoder respectively enables or disables one or more coding modes for the video sequence corresponding to the bitstream, based on the detected first flag(s). Similarly, the one or more coding modes may include the DMVR mode, the BDOF mode, the PROF mode, or any combination thereof. The decoder can detect, in the SPS of the bitstream, first flags 1312, 1314, and 1316, that correspond respectively to the DMVR mode, the BDOF mode, and the PROF mode.

At step 1540, the decoder detects at least one second flag in the SPS in response to one or more coding modes being enabled for the video sequence. At step 1550, the decoder determines whether a multi-level control is activated for one or more enabled modes in the one or more coding modes, based on the detected second flag(s).

At step 1560, the decoder detects at least one third flag in a picture header associated with a target picture or in a slice header associated with a target slice. At step 1570, in response to the multi-level control being activated, the decoder enables or disables one or more multi-level controlled modes in the target picture or the target slice, based on the detected third flag(s).

As discussed above, second flag(s) in steps 1540-1570 can be implemented in various ways. In some embodiments, whether the multi-level control is activated for the one or more enabled modes can be determined based on a single second flag (e.g., flag 1320 in FIGS. 13B-13E). In response to single second flag 1320 indicating that the multi-level control is enabled, the decoder can enable or disable one or more multi-level controlled modes of the one or more enabled modes in a target picture or a target slice. On the other hand, in some embodiments, the SPS can include one or more second flags (e.g., flags 1322, 1324, and 1326 in FIG. 13A) that respectively indicate whether the multi-level control is activated for the one or more enabled modes. In some other embodiments, the SPS can include at least one second flag corresponds to two or more coding modes. For example, flag 1360 in FIG. 13F and FIG. 13G corresponds to both the BODF mode and the PROF mode. For another example, flag 1370 in FIG. 13H and FIG. 13I corresponds to both the BODF mode and the DMVR mode.

Similarly, third flag(s) in steps 1540-1570 can also be implemented in various ways. In some embodiments, the decoder performs the enabling or disabling for the multi-level controlled mode(s) based on a single third flag 1330*a*-1330*n*, as shown in FIG. 13B. In some embodiments, the decoder performs the enabling or disabling for the multi-level controlled mode(s) based on one or more third flags 1332*a*-1332*n*, 1334*a*-1334*n*, and 1336*a*-1336*n* respectively corresponding to the multi-level controlled mode(s), as shown in FIG. 13A, FIG. 13C, FIG. 13G, and FIG. 13I. Moreover, in some embodiments, the decoder performs the enabling or disabling for the multi-level controlled mode(s) based on one or more flags, which include at least one flag corresponding to two or more coding modes. For example, flag 1340*a*-1340*n* in FIG. 13D and FIG. 13F corresponds to both the BODF mode and the PROF mode. For another example, flag 1350*a*-1350*n* in FIG. 13E and FIG. 13H corresponds to both the BODF mode and the DMVR mode.

In view of above, as proposed in various embodiments of the present disclosure, by coding two-level controlling flags in the bitstream, it is possible to enable or disable one or more coding tools, separately or jointly, for individual pictures or slices by using flags in corresponding picture headers or slide headers. The picture/slice level adaptation can improve the coding performance by disabling one or more coding tools, if they are less useful for the current picture or slice. In addition, in some embodiments, since coding tools may cause relatively high computational complexity, the picture/slice level adaptation can further reduce the encoding and decoding complexity by disabling some or all coding tools.

Various exemplary embodiments described herein are described in the general context of method steps or processes, which may be implemented in one aspect by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In some embodiments, the computer-readable medium may include a non-transitory computer-readable storage medium, and the computer-executable instructions may be executed by a device (e.g., the disclosed encoder and decoder), for performing the above-described methods. Common forms of non-transitory media include, for example, a floppy disk, a flexible disk, hard disk, solid state drive, magnetic tape, or any other magnetic data storage medium, a compact disc (CD), a digital versatile disc (DVD), or any other optical data storage medium, any physical medium with patterns of holes, a Read Only Memory (ROM), a Random Access Memory (RAM), a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The embodiments may further be described using the following clauses:

1. A non-transitory computer-readable storage medium storing a set of instructions that are executable by one or more processors of a device to cause the device to perform a method for decoding video, comprising:
receiving a bitstream;
determining whether one or more coding modes are enabled for a video sequence corresponding to the bitstream, based on one or more first flags in the bitstream; and
determining whether a multi-level control is activated for the one or more coding modes, based on at least one second flag in the bitstream.

2. The non-transitory computer-readable storage medium of clause 1, wherein the set of instructions that are executable by the one or more processors cause the device to further perform:
in response to the multi-level control being activated for the one or more coding modes, enabling or disabling, based on at least one third flag in the bitstream, the one or more coding modes for a target picture or a target slice in the video sequence.

3. The non-transitory computer-readable storage medium of clause 2, wherein the set of instructions that are executable by the one or more processors cause the device to further perform:
detecting, in the bitstream, the at least one third flag in a picture header associated with the target picture or in a slice header associated with the target slice.

4. The non-transitory computer-readable storage medium of any of clauses 1-3, wherein the one or more coding modes comprise a bi-directional optical flow (BDOF) mode, a prediction refinement with optical flow (PROF) mode, a decoder side motion vector refinement (DMVR) mode, or any combination thereof.

5. The non-transitory computer-readable storage medium of any of clauses 1-4, wherein the set of instructions that are executable by the one or more processors cause the device to further perform:
detecting the one or more first flags in a Sequence Parameter Set (SPS) of the video sequence.

6. The non-transitory computer-readable storage medium of any of clauses 1-5, wherein the set of instructions that are executable by the one or more processors cause the device to further perform:
in response to the one or more coding modes being enabled for the video sequence, detecting the at least one second flag in a Sequence Parameter Set (SPS).

7. The non-transitory computer-readable storage medium of any of clauses 1-6, wherein the one or more coding modes comprise a plurality of coding modes, and the one or more first flags comprise a plurality of first flags that correspond respectively to the plurality of coding modes, wherein determining whether the one or more coding modes are enabled for the video sequence comprises:
determining whether the plurality of coding modes are enabled for the video sequence, based on the plurality of first flags, respectively.

8. The non-transitory computer-readable storage medium of clause 7, wherein the at least one second flag comprises one or more second flags that respectively indicate whether the multi-level control is activated for the one or more coding modes, and the set of instructions that are executable by the one or more processors cause the device to further perform:
in response to the multi-level control being activated for the one or more coding modes, enabling or disabling, based on one or more third flags, the one or more coding modes for a target picture or a target slice, the one or more third flags respectively corresponding to the one or more coding modes.

9. The non-transitory computer-readable storage medium of clause 7, wherein determining whether the multi-level control is activated comprises:
determining whether the multi-level control is activated for the one or more coding modes based on a single second flag; and
in response to the single second flag indicating that the multi-level control is enabled for the one or more coding modes, enabling or disabling the one or more coding modes for a target picture or a target slice of the video sequence.

10. The non-transitory computer-readable storage medium of clause 9, wherein enabling or disabling the one or more coding modes comprises:
enabling or disabling the one or more coding modes for the target picture based on a single third flag in a picture header associated with the target picture, or
for the target slice based on a single third flag in a slice header associated with the target slice.

11. The non-transitory computer-readable storage medium of clause 9, wherein enabling or disabling the one or more coding modes comprises:
enabling or disabling the one or more coding modes for the target picture based on one or more third flags in a picture header associated with the target picture, respectively, or
for the target slice based on one or more third flags in a slice header associated with the target slice, respectively.

12. The non-transitory computer-readable storage medium of clause 9, wherein enabling or disabling the one or more coding modes comprises:
enabling or disabling two or more coding modes
for the target picture based on two or more third flags in a picture header associated with the target picture, or
for the target slice based on two or more third flags in a slice header associated with the target slice,
wherein at least one third flag corresponds to more than one coding mode.

13. The non-transitory computer-readable storage medium of clause 12, wherein the at least one third flag corresponds to at least two of a bi-directional optical flow (BDOF) mode, a prediction refinement with optical flow (PROF) mode, or a decoder side motion vector refinement (DMVR) mode.

14. The non-transitory computer-readable storage medium of clause 7, wherein determining whether the multi-level control is activated comprises:
determining whether the multi-level control is activated for the one or more coding modes based on one or more second flags, wherein the one or more second flags include at least one flag corresponding to two or more coding modes.

15. The non-transitory computer-readable storage medium of clause 14, wherein the set of instructions that are executable by the one or more processors cause the device to further perform:
in response to the multi-level control being enabled for the one or more coding modes, enabling or disabling, based on one or more third flags, the one or more coding modes for a target picture or a target slice, wherein the one or more third flags include at least one flag corresponding to the two or more coding modes.

16. The non-transitory computer-readable storage medium of clause 14, wherein the set of instructions that are executable by the one or more processors cause the device to further perform:
in response to the multi-level control being enabled for the one or more coding modes, enabling or disabling, based on one or more third flags, the one or more coding modes for a target picture or a target slice, wherein the one or more third flags respectively correspond to the one or more coding modes.

17. A non-transitory computer-readable storage medium storing a set of instructions that are executable by one or more processors of a device to cause the device to perform a method for encoding video, comprising:
coding one or more first flags in a sequence parameter set (SPS) of a bitstream, the one or more first flags indicating whether one or more coding modes are enabled for a video sequence associated with the bitstream; and
coding at least one second flag in the SPS if the one or more coding modes are enabled for the video sequence, the at least one second flag indicating whether a multi-level control is activated for the one or more coding modes.

18. The non-transitory computer-readable storage medium of clause 17, wherein the set of instructions that are executable by the one or more processors cause the device to further perform:
coding at least one third flag in the bitstream if the multi-level control is activated for the one or more coding modes, the at least one third flag indicating whether the one or more coding modes are disabled for a target picture or a target slice in the video sequence.

19. The non-transitory computer-readable storage medium of clause 18, wherein coding the at least one third flag comprises:
coding the at least one third flag in a picture header associated with the target picture; or
coding the at least one third flag in a slice header associated with the target slice.

20. The non-transitory computer-readable storage medium of clauses 18 or 19, wherein coding the at least one third flag comprises:
coding one or more third flags respectively corresponding to the one or more coding modes;
coding a single third flag corresponding to each of the one or more coding modes; or
coding a third flag corresponding to two or more coding modes.

21. The non-transitory computer-readable storage medium of any of clauses 17-20, wherein coding the at least one second flag comprises:
coding one or more second flags respectively corresponding to the one or more coding modes;
coding a single second flag corresponding to each of the one or more coding modes; or
coding a second flag corresponding to two or more coding modes.

22. The non-transitory computer-readable storage medium of any of clauses 17-21, wherein the one or more coding modes comprise a bi-directional optical flow (BDOF) mode, a prediction refinement with optical flow (PROF) mode, a decoder side motion vector refinement (DMVR) mode, or any combination thereof.

23. An apparatus, comprising:
a memory configured to store instructions; and
a processor coupled to the memory and configured to execute the instructions to cause the apparatus to:
receive a bitstream;
determining whether one or more coding modes are enabled for a video sequence corresponding to the bitstream, based on one or more first flags in the bitstream; and
determine whether a multi-level control is activated for the one or more coding modes, based on at least one second flag in the bitstream.

24. The apparatus of clause 23, wherein the processor is further configured to execute the instructions to cause the apparatus to:
in response to the multi-level control being activated for the one or more coding modes, enable or disable, based on at least one third flag in the bitstream, the one or more coding modes for a target picture or a target slice.

25. The apparatus of clause 24, wherein the processor is further configured to execute the instructions to cause the apparatus to:
detect, in the bitstream, the at least one third flag in a picture header associated with the target picture or in a slice header associated with the target slice.

26. The apparatus of any of clauses 23-25, wherein the one or more coding modes comprise a bi-directional optical flow (BDOF) mode, a prediction refinement with optical flow (PROF) mode, a decoder side motion vector refinement (DMVR) mode, or any combination thereof.

27. The apparatus of any of clauses 23-26, wherein the processor is further configured to execute the instructions to cause the apparatus to:
detect the one or more first flags in a Sequence Parameter Set (SPS) of the video sequence.

28. The apparatus of any of clauses 23-27, wherein the processor is further configured to execute the instructions to cause the apparatus to:
in response to the one or more coding modes being enabled for the video sequence, detect the at least one second flag in a Sequence Parameter Set (SPS).

29. The apparatus of any of clauses 23-28, wherein the one or more coding modes comprise a plurality of coding modes, and the one or more first flags comprise a plurality of first flags that correspond respectively to the plurality of coding modes, wherein determining whether the one or more coding modes are enabled for the video sequence comprises:
determining whether the plurality of coding modes are enabled for the video sequence, based on the plurality of first flags, respectively.

30. The apparatus of clause 29, wherein the at least one second flag comprises one or more second flags that respectively indicate whether the multi-level control is activated for the one or more coding modes, and the processor is further configured to execute the instructions to cause the apparatus to:
in response to the multi-level control being activated for the one or more coding modes, enable or disable, based on one or more third flags, the one or more coding modes for a target picture or a target slice, the one or more third flags respectively corresponding to the one or more coding modes.

31. The apparatus of clause 29, wherein the processor is further configured to execute the instructions to cause the apparatus to determine whether the multi-level control is activated by:
determining whether the multi-level control is activated for the one or more coding modes based on a single second flag; and
in response to the single second flag indicating that the multi-level control is enabled for the one or more coding modes, enabling or disabling the one or more coding modes for a target picture or a target slice of the video sequence.

32. The apparatus of clause 31, wherein the processor is further configured to execute the instructions to cause the apparatus to enable or disable the one or more coding modes by:
enabling or disabling the one or more coding modes
for the target picture based on a single third flag in a picture header associated with the target picture, or
for the target slice based on a single third flag in a slice header associated with the target slice.

33. The apparatus of clause 31, wherein the processor is further configured to execute the instructions to cause the apparatus to enable or disable the one or more coding modes by:
enabling or disabling the one or more coding modes
for the target picture based on one or more third flags in a picture header associated with the target picture, respectively, or
for the target slice based on one or more third flags in a slice header associated with the target slice, respectively.

34. The apparatus of clause 31, wherein the processor is further configured to execute the instructions to cause the apparatus to enable or disable the one or more coding modes by:
enabling or disabling two or more coding modes
for the target picture based on two or more third flags in a picture header associated with the target picture, or
for the target slice based on two or more third flags in a slice header associated with the target slice,
wherein at least one third flag corresponds to more than one coding mode.

35. The apparatus of clause 34, wherein the at least one third flag corresponds to at least two of a bi-directional optical flow (BDOF) mode, a prediction refinement with optical flow (PROF) mode, or a decoder side motion vector refinement (DMVR) mode.

36. The apparatus of clause 29, wherein the processor is further configured to execute the instructions to cause the apparatus to determine whether the multi-level control is activated by:
determining whether the multi-level control is activated for the one or more coding modes based on one or more second flags, wherein the one or more second flags include at least one flag corresponding to two or more coding modes.

37. The apparatus of clause 36, wherein the processor is further configured to execute the instructions to cause the apparatus to:
in response to the multi-level control being enabled, enable or disable, based on one or more third flags, the one or more coding modes for a target picture or a target slice, wherein the one or more third flags include at least one flag corresponding to the two or more coding modes.

38. The apparatus of clause 36, wherein the processor is further configured to execute the instructions to cause the apparatus to:
in response to the multi-level control being enabled for the one or more coding modes, enable or disable, based on one or more third flags, the one or more coding modes for a target picture or a target slice, wherein the one or more third flags respectively correspond to the one or more coding modes.

39. An apparatus, comprising:
a memory configured to store instructions; and
a processor coupled to the memory and configured to execute the instructions to cause the apparatus to:
code one or more first flags in a sequence parameter set (SPS) of a bitstream, the one or more first flags indicating whether one or more coding modes are enabled for a video sequence associated with the bitstream; and
code at least one second flag in the SPS if the one or more coding modes are enabled for the video sequence, the at least one second flag indicating whether a multi-level control is activated for the one or more coding modes.

40. The apparatus of clause 39, wherein the processor is further configured to execute the instructions to cause the apparatus to:
code at least one third flag in the bitstream if the multi-level control is activated for the one or more coding modes, the at least one third flag indicating whether the one or more coding modes are disabled for a target picture or a target slice in the video sequence.

41. The apparatus of clause 40, wherein the processor is further configured to execute the instructions to cause the apparatus to code the at least one third flag by:
coding the at least one third flag in a picture header associated with the target picture; or
coding the at least one third flag in a slice header associated with the target slice.

42. The apparatus of clauses 40 or 41, wherein the processor is further configured to execute the instructions to cause the apparatus to code the at least one third flag by:

coding one or more third flags respectively corresponding to the one or more coding modes;

coding a single third flag corresponding to each of the one or more coding modes; or coding a third flag corresponding to two or more coding modes.

43. The apparatus of any of clauses 39-42, wherein the processor is further configured to execute the instructions to cause the apparatus to code the at least one second flag by:

coding one or more second flags respectively corresponding to the one or more coding modes;

coding a single second flag corresponding to each of the one or more coding modes; or coding a second flag corresponding to two or more coding modes.

44. The apparatus of any of clauses 39-43, wherein the one or more coding modes comprise a bi-directional optical flow (BDOF) mode, a prediction refinement with optical flow (PROF) mode, a decoder side motion vector refinement (DMVR) mode, or any combination thereof.

45. A method for decoding video, comprising:

receiving a bitstream;

determining whether one or more coding modes are enabled for a video sequence corresponding to the bitstream, based on one or more first flags in the bitstream; and determining whether a multi-level control is activated for the one or more coding modes, based on at least one second flag in the bitstream.

46. The method of clause 45, comprising:

in response to the multi-level control being activated for the one or more coding modes, enabling or disabling, based on at least one third flag in the bitstream, the one or more coding modes for a target picture or a target slice in the video sequence.

47. The method of clause 46, further comprising:

detecting, in the bitstream, the at least one third flag in a picture header associated with the target picture or in a slice header associated with the target slice.

48. The method of any of clauses 45-47, wherein the one or more coding modes comprise a bi-directional optical flow (BDOF) mode, a prediction refinement with optical flow (PROF) mode, a decoder side motion vector refinement (DMVR) mode, or any combination thereof.

49. The method of any of clauses 45-48, further comprising:

detecting the one or more first flags in a Sequence Parameter Set (SPS) of the video sequence.

50. The method of any of clauses 45-49, further comprising:

in response to the one or more coding modes being enabled for the video sequence, detecting the at least one second flag in a Sequence Parameter Set (SPS).

51. The method of any of clauses 45-50, wherein the one or more coding modes comprise a plurality of coding modes, and the one or more first flags comprise a plurality of first flags that correspond respectively to the plurality of coding modes, wherein determining whether the one or more coding modes are enabled for the video sequence comprises:

determining whether the plurality of coding modes are enabled for the video sequence, based on the plurality of first flags, respectively.

52. The method of clause 51, wherein the at least one second flag comprises one or more second flags that respectively indicate whether the multi-level control is activated for the one or more coding modes, and the method further comprises:

in response to the multi-level control being activated for the one or more coding modes, enabling or disabling, based on one or more third flags, the one or more coding modes for a target picture or a target slice, the one or more third flags respectively corresponding to the one or more coding modes.

53. The method according to clause 51, wherein determining whether the multi-level control is activated comprises:

determining whether the multi-level control is activated for the one or more coding modes based on a single second flag; and in response to the single second flag indicating that the multi-level control is enabled for the one or more coding modes, enabling or disabling the one or more coding modes for a target picture or a target slice of the video sequence.

54. The method of clause 53, wherein enabling or disabling the one or more coding modes comprises:

enabling or disabling the one or more coding modes for the target picture based on a single third flag in a picture header associated with the target picture, or for the target slice based on a single third flag in a slice header associated with the target slice.

55. The method of clause 53, wherein enabling or disabling the one or more coding modes comprises:

enabling or disabling the one or more coding modes for the target picture based on one or more third flags in a picture header associated with the target picture, respectively, or for the target slice based on one or more third flags in a slice header associated with the target slice, respectively.

56. The method of clause 53, wherein enabling or disabling the one or more coding modes comprises:

enabling or disabling two or more coding modes for the target picture based on two or more third flags in a picture header associated with the target picture, or for the target slice based on two or more third flags in a slice header associated with the target slice, wherein at least one third flag corresponds to more than one coding mode.

57. The method of clause 54, wherein the at least one third flag corresponds to at least two of a bi-directional optical flow (BDOF) mode, a prediction refinement with optical flow (PROF) mode, or a decoder side motion vector refinement (DMVR) mode.

58. The method of clause 51, wherein determining whether the multi-level control is activated comprises:

determining whether the multi-level control is activated for the one or more coding modes based on one or more second flags, wherein the one or more second flags include at least one flag corresponding to two or more coding modes.

59. The method of clause 58, further comprising:

in response to the multi-level control being enabled for the one or more coding modes, enabling or disabling, based on one or more third flags, the one or more coding modes for a target picture or a target slice, wherein the one or more third flags include at least one flag corresponding to the two or more coding modes.

60. The method of clause 58, further comprising:

in response to the multi-level control being enabled for the one or more coding modes, enabling or disabling, based on one or more third flags, the one or more coding modes for a target picture or a target slice wherein the one or more third flags respectively correspond to the one or more coding modes.

61. A method for encoding video, comprising:
coding one or more first flags in a sequence parameter set (SPS) of a bitstream, the one or more first flags indicating whether one or more coding modes are enabled for a video sequence associated with the bitstream; and
coding at least one second flag in the SPS if the one or more coding modes are enabled for the video sequence, the at least one second flag indicating whether a multi-level control is activated for the one or more coding modes.

62. The method of clause 61, further comprising:
coding at least one third flag in the bitstream if the multi-level control is activated for the one or more coding modes, the at least one third flag indicating whether the one or more coding modes are disabled for a target picture or a target slice in the video sequence.

63. The method of clause 62, wherein coding the at least one third flag comprises:
coding the at least one third flag in a picture header associated with the target picture; or
coding the at least one third flag in a slice header associated with the target slice.

64. The method of clauses 62 or 63, wherein coding the at least one third flag comprises:
coding one or more third flags respectively corresponding to the one or more coding modes;
coding a single third flag corresponding to each of the one or more coding modes; or
coding a third flag corresponding to two or more coding modes.

65. The method of any of clauses 61-64, wherein coding the at least one second flag comprises:
coding one or more second flags respectively corresponding to the one or more coding modes;
coding a single second flag corresponding to the one or more coding modes; or
coding a second flag corresponding to two or more coding modes.

66. The method of any of clauses 61-65, wherein the one or more coding modes comprise a bi-directional optical flow (BDOF) mode, a prediction refinement with optical flow (PROF) mode, a decoder side motion vector refinement (DMVR) mode, or any combination thereof.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method of decoding a bitstream to output one or more pictures for a video stream, the method comprising:
receiving a bitstream; and
decoding, using coded information of the bitstream, one or more pictures,
wherein the decoding comprises:
determining whether a first plurality of sequence level flags are present in the bitstream, based on a second plurality of sequence level flags, respectively;
determining whether a plurality of picture level flags are present in the bitstream, based on the first plurality of sequence level flags, respectively; and
in response to one or more of the plurality of picture level flags being present in the bitstream, enabling or disabling one or more coding modes for a target picture based on the one or more of the plurality of picture level flags, respectively.

2. The method of claim 1, wherein the one or more coding modes comprise at least one of:
a prediction refinement with optical flow (PROF) mode, a bi-directional optical flow (BDOF) mode, or a decoder side motion vector refinement (DMVR) mode.

3. The method of claim 1, wherein the first plurality of sequence level flags is present in a Sequence Parameter Set (SPS) of the bitstream.

4. The method of claim 1, wherein:
the one or more of the plurality of picture level flags are present in a picture header; and the target picture refers to the picture header.

5. The method of claim 1, further comprising:
determining whether a plurality of coding modes are enabled for a video sequence associated with the bitstream, based on the second plurality of sequence level flags, respectively.

6. The method of claim 5, wherein the plurality of coding modes comprises at least one of:
a prediction refinement with optical flow (PROF) mode, a bi-directional optical flow (BDOF) mode, or a decoder side motion vector refinement (DMVR) mode.

7. The method of claim 5, wherein the second plurality of sequence level flags comprises a first sequence level flag associated with a prediction refinement with optical flow (PROF) mode, and the method further comprises:
determining, based on a second sequence level flag, whether an affine mode is enabled for the video sequence; and
in response to the affine mode being enabled, determining that the first sequence level flag is signaled in the bitstream and determining, based on the first sequence level flag, whether the PROF mode is enabled for the video sequence.

8. A method of encoding a video sequence into a bitstream, the method comprising:
receiving a video sequence;
encoding one or more pictures of the video sequence; and
generating a bitstream,
wherein the encoding comprises:
encoding a second plurality of sequence level flags in the bitstream, the second plurality of sequence level flags respectively indicating whether a first plurality of sequence level flags are present in the bitstream;
in response to one or more of the first plurality of sequence level flags are present in the bitstream, encoding the first plurality of sequence level flags in the bitstream, the first plurality of sequence level flags respectively indicating whether a plurality of picture level flags are present in the bitstream; and in response to one or more of the plurality of picture level flags being present in the bitstream, encoding the one or more of the plurality of picture level flags based on one or more coding modes associated with a target picture, respectively.

9. The method of claim 8, wherein the one or more coding modes comprise at least one of:
a prediction refinement with optical flow (PROF) mode, a bi-directional optical flow (BDOF) mode, or a decoder side motion vector refinement (DMVR) mode.

10. The method of claim 8, wherein the first plurality of sequence level flags is encoded in a Sequence Parameter Set (SPS) of the bitstream.

11. The method of claim 8, wherein:
the one or more of the plurality of picture level flags are encoded in a picture header that the target picture refers to.

12. The method of claim 8, wherein encoding the one or more of the plurality of picture level flags comprises:
setting values of the one or more of the plurality of picture level flags based on whether the respective coding modes are enabled or disabled for the target picture.

13. The method of claim 8, wherein the second plurality of sequence level flags respectively indicate whether a plurality of coding modes are enabled for a video sequence associated with the bitstream.

14. The method of claim 13, wherein the plurality of coding modes comprises at least one of:
a prediction refinement with optical flow (PROF) mode, a bi-directional optical flow (BDOF) mode, or a decoder side motion vector refinement (DMVR) mode.

15. The method of claim 13, wherein the second plurality of sequence level flags comprises a first sequence level flag indicating whether a prediction refinement with optical flow (PROF) mode is enabled for the video sequence, and the method further comprises:
encoding a second sequence level flag indicating whether an affine mode is enabled for the video sequence; and
in response to the affine mode being enabled for the video sequence, encoding the first sequence level flag, or
in response to the affine mode being disabled for the video sequence, skipping the encoding of the first sequence level flag.

16. A non-transitory computer-readable storage medium storing a bitstream of a video, the non-transitory computer-readable storage medium being part of a computing device configured to execute a set of instructions to cause the computing device to decode the bitstream according to operations comprising:
determining whether a first plurality of sequence level flags are present in the bitstream, based on a second plurality of sequence level flags, respectively;
determining whether a plurality of picture level flags are present in the bitstream, based on the first plurality of sequence level flags, respectively; and
in response to one or more of the plurality of picture level flags being present in the bitstream, enabling or disabling one or more coding modes for a target picture based on the one or more of the plurality of picture level flags, respectively.

17. The non-transitory computer-readable storage medium of claim 16, wherein the one or more coding modes comprises at least one of:
a prediction refinement with optical flow (PROF) mode, a bi-directional optical flow (BDOF) mode, or a decoder side motion vector refinement (DMVR) mode.

18. The non-transitory computer-readable storage medium of claim 16, wherein:
the one or more of the plurality of picture level flags are present in a picture header; and the target picture refers to the picture header.

19. The non-transitory computer-readable storage medium of claim 16, wherein the operations further comprise:
determining whether a plurality of coding modes are enabled for a video sequence associated with the bitstream, based on the second plurality of sequence level flags, respectively.

20. The non-transitory computer-readable storage medium of claim 19, wherein the second plurality of sequence level flags comprises a first sequence level flag associated with a prediction refinement with optical flow (PROF) mode, and the operations further comprise:
determining, based on a second sequence level flag, whether an affine mode is enabled for the video sequence; and
in response to the affine mode being enabled, determining that the first sequence level flag is signaled in the bitstream and determining, based on the first sequence level flag, whether the PROF mode is enabled for the video sequence.

* * * * *